(12) United States Patent
Jang et al.

(10) Patent No.: US 9,800,295 B2
(45) Date of Patent: Oct. 24, 2017

(54) SMART NFC ANTENNA MATCHING NETWORK SYSTEM HAVING MULTIPLE ANTENNAS AND USER DEVICE INCLUDING THE SAME

(71) Applicant: Samsung Electronics Co., Ltd., Suwon-si, Gyeonggi-do (KR)

(72) Inventors: Yohan Jang, Seoul (KR); Iljong Song, Suwon-si (KR); Hyounghwan Roh, Seoul (KR); Youngki Lee, Incheon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/244,420

(22) Filed: Aug. 23, 2016

(65) Prior Publication Data

US 2016/0359527 A1    Dec. 8, 2016

Related U.S. Application Data

(63) Continuation of application No. 14/559,198, filed on Dec. 3, 2014, now Pat. No. 9,438,313.

(30) Foreign Application Priority Data

Dec. 20, 2013   (KR) ........................ 10-2013-0160582

(51) Int. Cl.
    *H04B 5/00*          (2006.01)
    *G06Q 20/32*        (2012.01)

(52) U.S. Cl.
    CPC ....... *H04B 5/0087* (2013.01); *G06Q 20/3278* (2013.01); *H04B 5/0031* (2013.01); *H04B 5/0056* (2013.01); *H04B 5/0081* (2013.01)

(58) Field of Classification Search
None
See application file for complete search history.

(56) References Cited

U.S. PATENT DOCUMENTS

| | | |
|---|---|---|
| 7,347,379 B2 | 3/2008 | Ward et al. |
| 7,494,069 B2 | 2/2009 | Shimada |
| 7,876,284 B2 | 1/2011 | Mizoroki et al. |
| 8,041,295 B2 | 10/2011 | Simada |
| 8,288,893 B2 | 10/2012 | Cook et al. |
| 8,378,917 B2 | 2/2013 | Yoneda et al. |

(Continued)

FOREIGN PATENT DOCUMENTS

| | | |
|---|---|---|
| JP | 2000067194 A | 3/2000 |
| JP | 2005323019 A | 11/2005 |

(Continued)

*Primary Examiner* — David Bilodeau
(74) *Attorney, Agent, or Firm* — Harness, Dickey & Pierce, P.L.C.

(57) ABSTRACT

A near field communication (hereinafter, referred to as "NFC") antenna matching network system connected to an NFC transceiver is provided. The NFC antenna matching network system includes a matching circuit connected to first and second antenna terminals and to the NFC transceiver; and a plurality of NFC antennas connected in parallel and physically with the first and second antenna terminals, wherein each of the NFC antennas comprises a source coil connected between the first antenna terminal and the second antenna terminal; and a resonance coil physically separated from the source coil.

39 Claims, 14 Drawing Sheets

(56) References Cited

U.S. PATENT DOCUMENTS

| | | |
|---|---|---|
| 2005/0087599 A1 | 4/2005 | Ward et al. |
| 2007/0004456 A1 | 1/2007 | Shimada |
| 2009/0061768 A1 | 3/2009 | Simada |
| 2009/0091501 A1 | 4/2009 | Mizoroki et al. |
| 2010/0044444 A1 | 2/2010 | Jain et al. |
| 2010/0117454 A1 | 5/2010 | Cook et al. |
| 2010/0194660 A1 | 8/2010 | Yoneda et al. |
| 2011/0128125 A1 | 6/2011 | Kai et al. |
| 2011/0266883 A1 | 11/2011 | Eray |
| 2012/0286584 A1* | 11/2012 | Park ........................ H01F 38/14 307/104 |
| 2014/0154980 A1 | 6/2014 | Jang et al. |

FOREIGN PATENT DOCUMENTS

| | | | |
|---|---|---|---|
| JP | 2006262055 A | 9/2006 |
| JP | 2006302219 A | 11/2006 |
| JP | 2009075966 A | 4/2009 |
| JP | 2010004257 A | 1/2010 |
| JP | 2011091500 A | 5/2011 |
| JP | 5218369 B2 | 6/2013 |
| KR | 1020080073120 A | 8/2008 |
| KR | 1020110115767 A | 10/2011 |
| KR | 101080651 B1 | 11/2011 |
| KR | 101121442 B1 | 3/2012 |
| KR | 101210941 B1 | 12/2012 |
| KR | 1020140072643 A | 6/2014 |

\* cited by examiner (d1=0mm)

SMART NFC ANTENNA MATCHING NETWORK SYSTEM HAVING MULTIPLE ANTENNAS AND USER DEVICE INCLUDING THE SAME

CROSS-REFERENCE TO RELATED APPLICATIONS

This is a continuation of U.S. application Ser. No. 14/559,198, filed on Dec. 3, 2014, which claims priority under 35 U.S.C. §119 to Korean Patent Application No. 10-2013-0160582 filed Dec. 20, 2013, in the Korean Intellectual Property Office, the entire contents of each of which are hereby incorporated by reference.

BACKGROUND

The inventive concepts described herein relate to a Near Field Communication (hereinafter, referred to as "NFC") antenna matching network system for a contactless mobile POS using NFC.

In general, an RFID (Radio Frequency Identification) may concern to one of the automatic recognition fields using radio waves. The RFID may be also called a radio frequency recognition system configured to recognize pre-stored predetermined information wirelessly using radio waves such as ultra-short waves or long waves.

The RFID system may use signals to be free from ambient environment such as snow, rain, dust and magnetic flux, for example. Furthermore, the recognition speed may be fast such that recognition is possible even in transit, and at a predetermined long distance. The RFID system may be provided with an intrinsic ID (identification) in the manufacturing process to substantially prevent itself from being fabricated or counterfeited.

Principle of the RFID system may be to recognize information recorded in a tag via a wireless communication. The recorded information may belong to RFID fields for example a bar code label, a magnetic stripe, etc. An RFID reader may receive information stored in the tag via an antenna. The RFID reader may recognize and analyze the received information, and may obtain inherent and circumstance information for a product where the tag is applied or, incorporated.

The RFID system may include for example a reader, an antenna, a tag, and the like. The antenna may perform an intermediation function between the tag and the reader. A power and a signal may be sent to the tag via the antenna using a wireless communication such that the tag is activated. Further, a response from the tag may be received via the antenna.

Meanwhile, a NFC (Near Field Communication) belonging to a field of the RFID may use a frequency (e.g., 13.56 MHz) of a high frequency band and transmit data at a distance with low power. The NFC scheme may be standardized in ISO/IEC 18092. The NFC scheme can perform a short distance radio communication using various frequency signals including 125 kHz, 135 kHz, and 900 kHz in addition to the 13.56 MHz.

An NFC device may have such advantages of communicating or being compatible with existing information devices including portable wireless terminals and notebook computers through exchanges of address books, game and MP3 files. The NFC technology using a predetermined frequency band may be high in its safety and already in use for public transportation and mobile phone payment. The NFC technology may be utilized as a future information terminal capable of obtaining a variety of information by approaching a tag stored with predetermined information.

A mobile phone embedded with NFC chips may be in an early distribution stage and the NFC technology may be expected to be widely adopted in mobile terminals including portable wireless terminals. The portable terminals embedded with NFC chips may be generally mounted with an NFC antenna and may communicate with an external reader via the NFC antenna.

SUMMARY

One aspect of embodiments of the inventive concept is directed to provide a near field communication (hereinafter, referred to as "NFC") antenna matching network system connected to an NFC transceiver, comprising a matching circuit connected to first and second antenna terminals and to the NFC transceiver; and a plurality of NFC antennas connected in parallel and physically with the first and second antenna terminals, wherein each of the NFC antennas comprises a source coil connected between the first antenna terminal and the second antenna terminal; and a resonance coil physically separated from the source coil.

In exemplary embodiments, the matching circuit comprises a first capacitor connected between the first antenna terminal and the NFC transceiver; and a second capacitor connected between the second antenna terminal and the NFC transceiver.

In exemplary embodiments, the matching circuit comprises at least one of a first resistor and a first inductor connected between the first capacitor and the first antenna terminal; and at least one of a second resistor and a second inductor connected between the second capacitor and the second antenna terminal.

In exemplary embodiments, each of the NFC antennas further comprises a third capacitor connected in parallel with the resonance coil.

In exemplary embodiments, at least one of a third resistor and a third inductor is connected in series between the resonance coil and the third capacitor.

In exemplary embodiments, the resonance coil and the third capacitor form a parallel resonator, the source coil of each of the NFC antennas and the first and second capacitors form a serial resonator, and the parallel resonator of each of the NFC antennas is physically separated from the source coil of each of the NFC antennas.

In exemplary embodiments, the source coil of each of the NFC antennas is formed of a first conductive line having a single-loop shape or a multi-loop shape, and the resonance coil of each of the NFC antennas is formed of a second conductive line having a spiral shape.

In exemplary embodiments, antenna areas where the NFC antennas are formed have different sizes such that NFC antennas with different sizes are formed.

Another aspect of embodiments of the inventive concept is directed to provide a user device comprising an NFC transceiver; and an NFC antenna matching network system connected to the NFC transceiver. The NFC antenna matching network system comprises a first capacitor connected between a first terminal of the NFC transceiver and a first antenna terminal; a second capacitor connected between a second terminal of the NFC transceiver and a second antenna terminal; a plurality of source coils connected in parallel and physically between the first antenna terminal and the second antenna terminal; and a plurality of parallel resonators corresponding to the source coils and each physically separated from a corresponding source coil.

In exemplary embodiments, the plurality of source coils includes at least first and second source coils, the plurality of parallel resonators includes at least first and second parallel resonators, and the first source coil and the first parallel resonator form a first NFC antenna and the second source coil and the second parallel resonator form a second NFC antenna.

In exemplary embodiments, antenna areas where the first and second NFC antennas are formed have different sizes such that NFC antennas with different sizes are formed.

In exemplary embodiments, the first and second NFC antennas are disposed at different locations of the user device.

In exemplary embodiments, each of the parallel resonators comprises a resonance coil and a capacitor connected in parallel with the resonance coil.

In exemplary embodiments, each of the source coils is formed of a first conductive line having a single-loop shape or a multi-loop shape and the resonance coil of each of the parallel resonators is formed of a second conductive line having a spiral shape.

Still another aspect of embodiments of the inventive concept is directed to provide an NFC antenna matching network system connected to an NFC transceiver, comprising a matching circuit connected to first and second antenna terminals and to the NFC transceiver; a plurality of source coils connected in series between the first antenna terminal and the second antenna terminal; and a plurality of resonance coils corresponding to the source coils, the plurality of resonance coils being physically separated from a corresponding source coil.

A further aspect of embodiments of the inventive concept is directed to provide an NFC antenna matching network system for a mobile POS connected to an NFC transceiver, comprising a source coil connected between first and second terminals of the NFC transceiver; and a resonance coil physically separated from the source coil, wherein the resonance coil has a plurality of winding turns, and wherein an interval between an innermost edge of a turn, adjacent to an outermost edge of the source coil, from among the winding turns of the resonance coil and the outermost edge of the source coil is within about 0 mm to 1 mm.

In exemplary embodiments, the resonance coil has inductance of about 4 µH to 9 µH.

In exemplary embodiments, the resonance coil is formed within an area of about 20 $cm^2$ to 54 $cm^2$.

In exemplary embodiments, the resonance coil has a width of about 0.5 mm to 1.2 mm and an interval between adjacent winding turns of the resonance coil is within 0.3 mm to 0.6 mm.

Another aspect of embodiments of the inventive concept is directed to a near field communication (NFC) antenna connected to an NFC transceiver. The NFC antenna may include a source coil connected between first and second terminals of the NFC transceiver, the source coil includes a loop shape, the loop shape defining an inner space, and a first resonance coil physically separated from the source coil, wherein one or more turns of the first resonance coil are provided inside of the opening.

Another aspect of embodiments of the inventive concept is directed to a near field communication (NFC) antenna connected to an NFC transceiver. The NFC antenna may include a first source coil connected to a first terminal of the NFC transceiver, and a first resonance coil physically separated from the first source coil, the first resonance coil having a loop shape, the loop shape defining an inner space, wherein one or more turns of the first source coil is provided inside of the opening.

Another aspect of embodiments of the inventive concept is directed to a near field communication (NFC) antenna matching network system connected to an NFC transceiver. The NFC antenna matching network system may include a first serial resonator having a first loop shape, the first loop shape defining a first inner space, the first serial resonator being between a first and second terminals of the NFC transceiver, a first parallel resonator having a second loop shape, the second loop shape defining a second inner space, electrically isolated from the first serial resonator, the first parallel resonator configured to exchange signals with the first serial resonator via inductive coupling, and a matching circuit electrically connected between the NFC transceiver and the first serial resonator. The matching circuit may be configured to match impedances within the NFC antenna matching network system.

Another aspect of embodiments of the inventive concept is directed to a mobile device including an application processor, a near field communication (NFC) transceiver connected to the application processor, a matching circuit connected to the NFC transceiver, and at least one NFC antenna connected to the matching circuit. The matching circuit may be configured to match impedances of the at least one NFC antenna and the NFC transceiver. The at least one NFC antenna may include a serial resonator between first and second terminals of the NFC transceiver, and a parallel resonator electrically isolated from the serial resonator and configured to exchange signals with the serial resonator via inductive coupling.

A portable terminal for a mobile POS is provided which includes an NFC transceiver; and an NFC antenna matching network system connected to the NFC transceiver. The NFC transceiver comprises a reader circuit, a card circuit, and a connection unit connecting the reader circuit and the card circuit to the NFC antenna matching network system. The NFC antenna matching network system comprises a first capacitor having one end connected to the connection unit; a source coil having one end connected to the other end of the first capacitor, a second capacitor having one end connected to the connection unit and the other end connected to the other end of the source coil; and a parallel resonator having a resonance coil and physically separated from the source coil. The resonance coil has a plurality of winding turns, and an interval between an innermost edge of a turn, adjacent to an outermost edge of the source coil, from among the winding turns of the resonance coil and the outermost edge of the source coil is within about 0 mm to 1 mm. The resonance coil is formed within an area of about 20 $cm^2$ to 54 $cm^2$, the resonance coil has inductance of about 4 µH to 9 µH, and the resonance coil has a width of about 0.5 mm to 1.2 mm and an interval between adjacent winding turns of the resonance coil is within 0.3 mm to 0.6 mm.

With embodiments of the inventive concept, credit card purchase and payment are made using one terminal (e.g., a smart phone). For example, in a portable terminal (e.g., a smart phone) in which an NFC chip is embedded, the portable terminal is used as purchase means by inputting personal card information in the portable terminal. Also, the portable terminal (e.g., a smart phone) is used as payment means by recognizing an external mobile card or a credit card via an NFC antenna matching network system of the inventive concept. Thus, the portable terminal (e.g., the smart phone) of the inventive concept supports the credit card purchase and the credit card payment without a dongle for POS.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
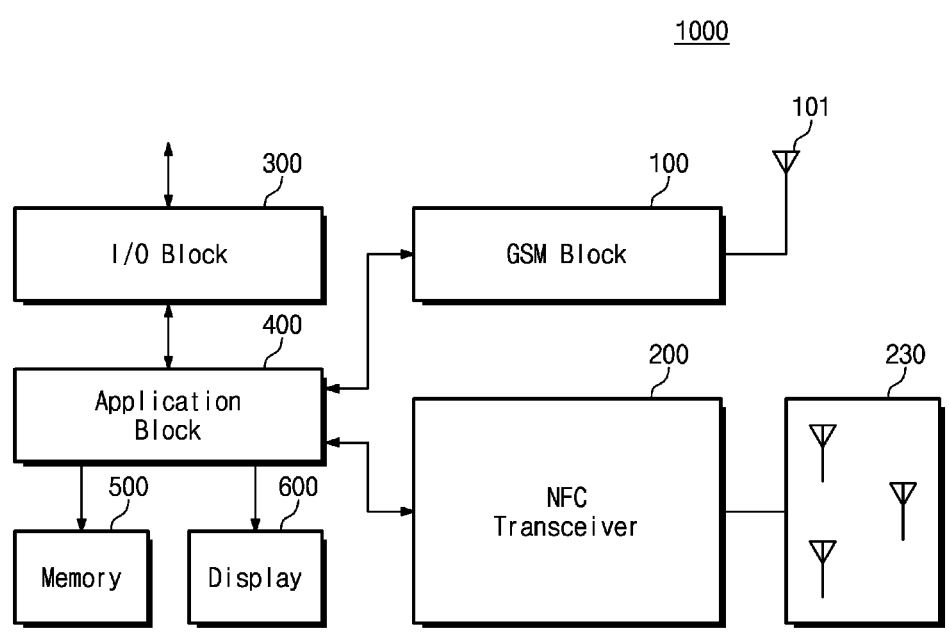
FIG. 1 is a block diagram of an example device in which several embodiments may be implemented.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram of an example device in which several embodiments may be implemented. A device illustrating in FIG. 1 may be a mobile phone as a user device. However, it is well understood that the inventive concept is not limited to the mobile phone.

Referring to FIG. 1, a mobile phone 1000 includes a Global System for Mobile Communication (GSM) block 100, a Near Field Communication (NFC) transceiver 200, an input/output (I/O) block 300, an application block 400, a memory 500, and a display 600. The components/blocks of the mobile phone 1000 in FIG. 1 may be shown merely by way of illustration. However, the mobile phone 100 may contain more or fewer components/blocks. Further, although described as using GSM technology, the mobile phone 100 may instead be implemented using other technologies such as CDMA (Code Division Multiple Access) also. The blocks of FIG. 1 may be implemented in an integrated circuit (IC)

form. Alternatively, some of the blocks may be implemented in an IC form, while other blocks may be in a discrete form.

GSM block 100 is connected to an antenna 101 and operates to provide wireless telephone operations in a known way. The GSM block 100 contains receiver and transmitter sections internally (not shown) to perform corresponding receive and transmit operations.

The NFC transceiver 200 uses inductive coupling for wireless communication and is configured to receive and transmit NFC signals. The NFC transceiver 200 provides NFC signals to an NFC antenna matching network system 230, and the NFC antenna matching network system 230 transmits NFC signals through inductive coupling. The NFC antenna matching network system 230 receives NFC signals (provided from another NFC device (not shown)) and provides the received NFC signals to the NFC transceiver 200. The NFC antenna matching network system 230, as illustrated in FIG. 1, includes a plurality of antennas. This will be more fully described later.

The NFC transceiver 200 operates consistent with specifications described in Near Field Communication Interface and Protocol-1 (NFCIP-1) and Near Field Communication Interface and Protocol-2 (NFCIP-2) and standardized in ECMA-340, ISO/IEC 18092, ETSI TS 102 190, ISO 21481, ECMA 352, ETSI TS 102 312, etc.

The application block 400 contains corresponding hardware circuitry (e.g., one or more processors) and operates to provide various user applications provided by mobile phone 1000. The user applications may include voice call operations, data transfers, etc. The application block 400 operates in conjunction with the GSM block 100 to provide such features. The application block 400 includes a program for a mobile point of sales (hereinafter, referred to as a mobile POS). Such a program provides credit card purchase and payment functions using a mobile phone, that is, a smart phone.

The display 600 displays images in response to the corresponding display signals received from the application block 400. The images may be generated by a camera provided in mobile phone 100, but not shown in FIG. 1. The display 600 contains memory (e.g., a frame buffer) internally for temporary storage of pixel values for image refresh purposes and may be implemented, for example, as a liquid crystal display screen with associated control circuits. The I/O block 300 provides a user with the facility to provide a user with an input function. In addition, the I/O block 300 may provide outputs that are received via the application block 400.

The memory 500 stores program (instructions) and/or data used by the applications block 400 and is implemented with RAM, ROM, flash memory, etc. Thus, the memory 500 contains volatile as well as nonvolatile storage elements.

The NFC antenna matching network system 230 communicates with external devices by inductive coupling and is used for both transmission and reception of NFC signals.

The NFC antenna matching network system 230 includes a plurality of antennas (or, NFC antennas) with different sizes. The antennas, also, are installed at different positions (e.g., a front surface, a rear surface, a center, an outside, a flip cover, a battery pack, and the like of the mobile phone 1000). This will be more fully described later. As one NFC transceiver 200 uses a plurality of antennas, it is possible to improve facility of the user, to utilize NFC functions sufficiently, and to secure maximal performance between the antennas and the NFC transceiver 200 as an NFC chip.

Transmission and reception of NFC signals by the NFC transceiver 200 may be performed in a time division multiplexed (TDM) method. Accordingly, a time interval in which the NFC transceiver 200 transmits NFC signals may be termed a transmit interval, and the corresponding mode of operation of the NFC transceiver 200 may be viewed as a 'transmit mode' or "NFC reader transmit mode". Similarly, a time interval in which the NFC transceiver 200 receives NFC signals may be termed a receive interval, and the corresponding mode of operation of the NFC transceiver 200 may be viewed as a 'receive mode' or "NFC tag receive mode".

Figure 2:
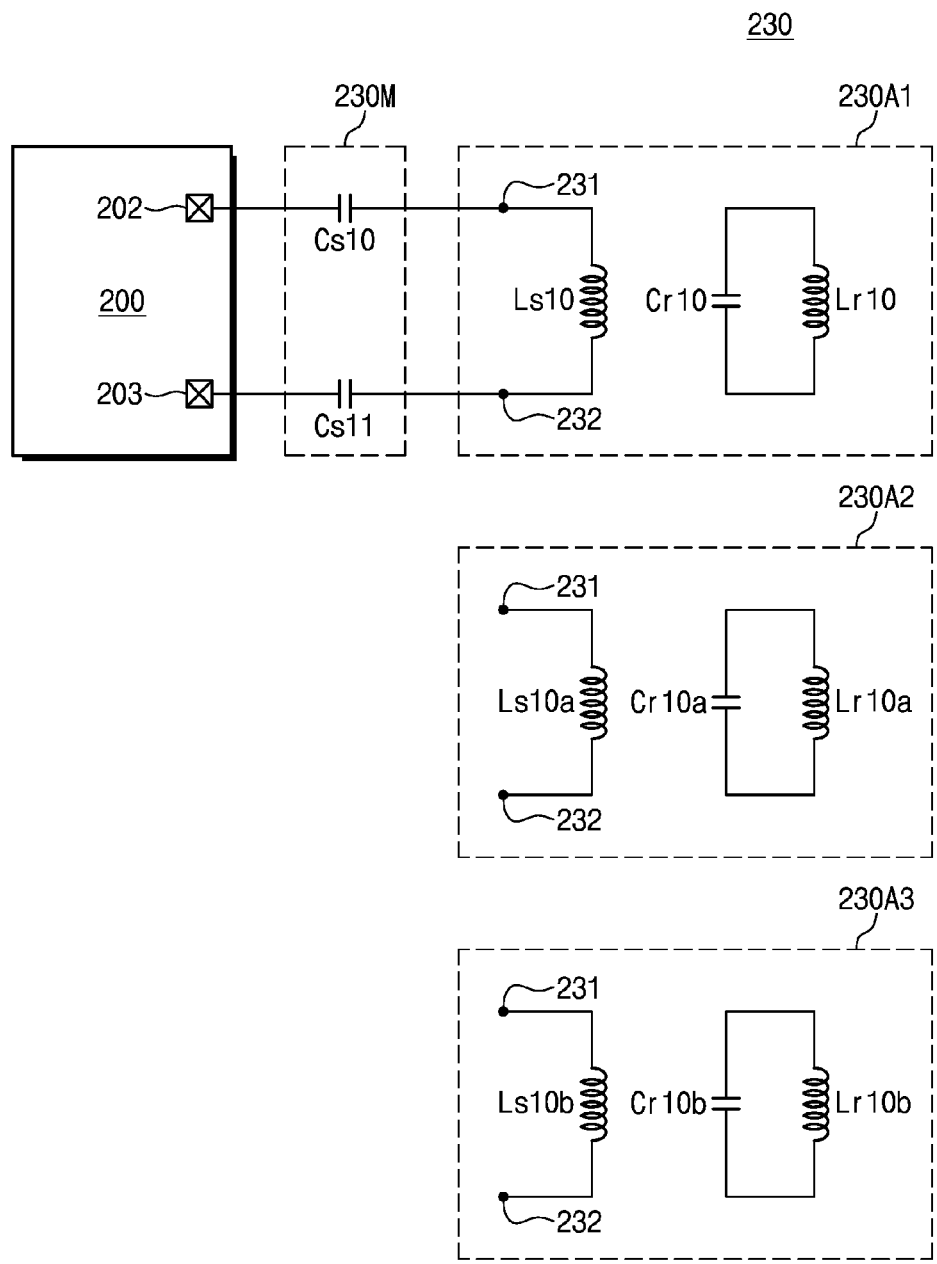
FIG. 2 is a diagram schematically illustrating an NFC antenna matching network system shown in FIG. 1, according to an embodiment of the inventive concept.

FIG. 2 is a diagram schematically illustrating an NFC antenna matching network system shown in FIG. 1, according to an embodiment of the inventive concept.

Referring to FIG. 2, a NFC antenna matching network system 230 according to an embodiment of the inventive concept includes capacitors Cs10, Cs11, and Cr10 and inductors Ls10 and Lr10. The NFC antenna matching network system 230 is electrically connected with chip terminals 202 and 203 of an NFC transceiver 200 (or, referred to as an NFC chip). In FIG. 2, there is illustrated an example in which the NFC transceiver 200 includes only two terminals. However, the inventive concept is not limited thereto.

The capacitor Cs10 is connected between the chip terminal 202 and an antenna terminal 231, and the capacitor Cs11 is connected between the chip terminal 203 and the antenna terminal 231. As a source coil, an inductor Ls10 is connected between the antenna terminals 231 and 232. The inductor Ls10 and the capacitors Cs10 and Cs11 may form a serial resonator. In example embodiments, the inductor Ls10 may be referred to as a source coil. The capacitor Cr10 and the inductor Lr10 may form a parallel resonator. As illustrated in FIG. 2, the parallel resonator formed of the capacitor Cr10 and the inductor Lr10 may be physically separated from the serial resonator that is electrically connected with the chip terminals 202 and 203. In example embodiments, the inductor Lr10 may be referred to as a resonant coil. The source coil may be physically separated from the resonant coil. In other words, the resonant coil Lr10 may be electrically floated from the source coil Ls10. In other words, the source coil Ls10 may be supplied with a power from the reader 210, and the resonant coil Lr10 may be supplied with a power from the source coil Ls10 by magnetic induction. The resonant coil Lr10 transmits or receives NFC signals by parallel resonance.

Although not shown in FIG. 2, the NFC transceiver 200 may include a reader, a card circuit, etc. The read and card circuit of the NFC transceiver 200 are connected in common to a matching circuit 230M through the chip terminals 202 and 203. Also, the reader of the NFC transceiver 200 is connected to the matching circuit 230M through the chip terminals 202 and 203, and the card circuit thereof is connected to the matching circuit 230M through other chip terminals. However, it is understood that connection between the reader and card circuit of the NFC transceiver 200 and the matching circuit 230M is not limited to this disclosure.

In example embodiments, the capacitor Cr10 connected in parallel with the resonant coil Lr10 may be a lumped element or parasite capacitance parasitized on the resonant coil Lr10. Here, if a resonance frequency (e.g., 13.56 MHz) is obtained through the resonant coil Lr10, the capacitor Cr10 of the parallel resonator may be parasite capacitance. In contrast, if the resonance frequency is not obtained through the resonant coil Lr10, the capacitor Cr10 of the parallel resonator may be a lumped element.

At a transmission mode of the NFC transceiver 200, the source coil Ls10 (or, inductance of the source coil Ls10) and the capacitors Cs10 and Cs11 may form a serial resonator. When a current supplied from the reader 210 flows to the source coil Cs10, a magnetic field may be generated around the source coil Cs10. At this time, the magnetic field formed at the source coil Cs10 may enable an induced current to flow at the resonant coil Lr10 being floated. In other words, the resonant coil Lr10 may be supplied with a power from the source coil Ls10 by the magnetic induction. Capacitance of the capacitor Cr10 and inductance of the resonant coil Lr10 may be decided to resonate with a center frequency (e.g., 13.56 MHz) of a band of frequencies occupied by an NFC signal output from the reader according to a power supplied by the magnetic induction. At the transmission mode of the NFC transceiver 200, the reader may transmit NFC signals through the chip terminals 202 and 203.

At a reception mode of the NFC transceiver 200, the source coil Ls10 (or, inductance of the source coil Ls10) and the capacitors Cs10 and Cs11 may form a serial resonator. The parallel resonator formed of the resonant coil Lr10 and the capacitor Cr10 may resonate with an NFC signal transmitted from an external NFC device. An induced current may flow at the source coil Ls10 by a magnetic field formed around the resonant coil Lr10. In other words, the source coil Ls10 may be supplied with a power from the resonant coil Lr10 by the magnetic induction. NFC signals received via the parallel resonator may be provided to the reader 210 via the serial resonator formed of the capacitors Cs10 and Cs11 and the source coil Ls10. At the reception mode of the NFC transceiver 200, the reader may receive NFC signals via the chip terminals 202 and 203.

Although not shown in FIG. 2, a capacitor may be connected in parallel between the antenna terminals 231 and 232. That is, the capacitor may be selectively used.

In exemplary embodiments, the capacitors Cs10 and Cs11 form the matching circuit 230M of the NFC antenna network system 230. If the capacitor Cr10 is formed of parasitic capacitance, the source coil LS10 and the resonance coil Lr10 form a first NFC antenna 230A1. Alternatively, if the capacitor Cr10 is formed of a lumped capacitor, the source coil LS10, the capacitor Cr10, and the resonance coil Lr10 form the first NFC antenna 230A1.

In a typical NFC antenna matching network system, capacitors for serial resonance and capacitors for parallel resonance may be electrically connected with an antenna. In this case, the capacitors for serial resonance may be affected by the capacitors for parallel resonance in terms of impedance, or the capacitors for parallel resonance may be affected by the capacitors for serial resonance in terms of impedance. This influence may cause lowering of a transfer performance (or, a quality factor) of the typical NFC antenna matching network system. For example, high impedance of the typical NFC antenna matching network system may act as a limitation when a magnetic field is generated at a reader mode.

In contrast, the NFC antenna matching network system 230 according to an embodiment of the inventive concept may transmit and receive NFC signals under a condition where a serial resonator suitable for a transmission mode (i.e., advantageous to form a magnetic field) and a parallel resonator suitable for a reception mode (i.e., advantageous to be supplied with a power) are physically separated. In this case, the serial resonator and the parallel resonator may not be influenced each other in terms of impedance. Compared with a typical NFC antenna matching network system, impedance seen from the resonant coil Lr10 may be low. The reason may be that the resonant coil Lr10 is floated. This may mean that impedance of the source coil Lr10 is reduced. As impedance is reduced, the amount of current flowing via the source coil Ls10 may increase relatively. This may mean that the strength of current induced at the resonant coil Lr10 (or, the strength of a magnetic field) increases. As the strength of current induced or the strength of a magnetic field increases, a recognition distance or a reception voltage may increases. In this case, as impedance of a reader mode of a serial resonance become low, reception of a high current is possible. As impedance of a reader mode of a parallel resonance become high, a high voltage is induced. An increase in a magnetic field enables freedom of an antenna location to increase; therefore, performance of a small-sized antenna is improved.

The NFC antenna network system 230 further comprises a second NFC antenna 230A2. The second NFC antenna 230A2 is connected to the matching circuit 230M, that is, to the antenna terminals 231 and 232 and includes an inductor Ls10a, a capacitor Cr10a, and an inductor Lr10a. As a source coil, an inductor Ls10a is connected between the antenna terminals 231 and 232. The inductor Ls10a and the capacitors Cs10 and Cs11 may form a serial resonator. In example embodiments, the inductor Ls10a may be referred to as a source coil. The capacitor Cr10a and the inductor Lr10a may form a parallel resonator. Like the first NFC antenna 230A1, the parallel resonator formed of the capacitor Cr10 and the inductor Lr10a may be physically separated from the serial resonator that is electrically connected with the chip terminals 202 and 203. In example embodiments, the inductor Lr10a may be referred to as a resonant coil. In the second NFC antenna 230A2, the source coil may be physically separated from the resonant coil. In other words, the resonant coil Lr10a may be electrically floated from the source coil Ls10a. In other words, the source coil Ls10a may be supplied with a power from the reader 210, and the resonant coil Lr10a may be supplied with a power from the source coil Ls10a by magnetic induction. The resonant coil Lr10a transmits or receives NFC signals by parallel resonance.

The second NFC antenna 230A2 also obtains the same effect as the first NFC antenna 230A1, that is, the above-described impedance reduction effect. The amount of current flowing via the source coil Ls10a may increase relatively. This may mean that the strength of current induced at the resonant coil Lr10a (or, the strength of a magnetic field) increases. As the strength of current induced or the strength of a magnetic field increases, a recognition distance or a reception voltage may increases. In this case, as impedance of a reader mode of a serial resonance become low, reception of a high current is possible. As impedance of a reader mode of a parallel resonance become high, a high voltage is induced. An increase in a magnetic field enables freedom of an antenna location to increase; therefore, performance of a small-sized antenna is improved.

Continuing to refer to FIG. 2, the NFC antenna network system 230 further comprises a third NFC antenna 230A3. The third NFC antenna 230A3 is connected to the matching circuit 230M, that is, to the antenna terminals 231 and 232 and includes an inductor Ls10b, a capacitor Cr10b, and an inductor Lr10b. As a source coil, an inductor Ls10b is connected between the antenna terminals 231 and 232. The inductor Ls10b and the capacitors Cs10 and Cs11 may form a serial resonator. In example embodiments, the inductor Ls10b may be referred to as a source coil. The capacitor Cr10b and the inductor Lr10b may form a parallel resonator. Like the first NFC antenna 230A1, the parallel resonator formed of the capacitor Cr10 and the inductor Lr10b may be physically separated from the serial resonator that is electrically connected with the chip terminals 202 and 203.

In example embodiments, the inductor Lr10b may be referred to as a resonant coil. In the third NFC antenna 230A2, the source coil may be physically separated from the resonant coil. In other words, the resonant coil Lr10b may be electrically floated from the source coil Ls10b. In other words, the source coil Ls10b may be supplied with a power from the reader 210, and the resonant coil Lr10b may be supplied with a power from the source coil Ls10b by magnetic induction. The resonant coil Lr10b transmits or receives NFC signals by parallel resonance.

The third NFC antenna 230A3 also obtains the same effect as the first NFC antenna 230A1, that is, the above-described impedance reduction effect. The amount of current flowing via the source coil Ls10b may increase relatively. This may mean that the strength of current induced at the resonant coil Lr10b (or, the strength of a magnetic field) increases. As the strength of current induced or the strength of a magnetic field increases, a recognition distance or a reception voltage may increases. In this case, as impedance of a reader mode of a serial resonance become low, reception of a high current is possible. As impedance of a reader mode of a parallel resonance become high, a high voltage is induced. An increase in a magnetic field enables freedom of an antenna location to increase; therefore, performance of a small-sized antenna is improved.

With an embodiment of the inventive concept, an area (hereinafter, referred to as a first antenna area) where the first NFC antenna 230A1 is formed, an area (hereinafter, referred to as a second antenna area) where the second NFC antenna 230A2 is formed, and an area (hereinafter, referred to as a third antenna area) where the third NFC antenna 230A2 is formed are different from one another in size. Also, the first to third antenna areas may be disposed at different locations of a mobile phone 1000. With this antenna structure, it is possible to tune a frequency of each NFC antenna optimally, and freedom of an antenna location increases through an increase in a magnetic field. In the event that the serial resonator and the parallel resonator are physically separated from each other, it is possible to change a matching network to be faithful to functions of NFC antennas.

As well known, an antenna size of an external reader (or, an area where an antenna is formed) may be variable according to uses/purposes. For example, the size of an antenna used in a P2P (Pear-to-Pear) method for simple data communications is different from the size of an antenna used in a POS (Point Of Sales) method for credit card payment. That is, communications between external readers with different sizes of antennas and a terminal where an NFC antenna with a single signal is located is not smooth. In the inventive concept, since NFC antennas with different sizes of antennas are mounted together with a terminal, an NFC antenna with an antenna size similar or equal to an antenna size of the external reader provides smooth communication with an external reader.

In FIG. 2, there is illustrated an example in which the NFC antenna matching network system 230 includes three NFC antennas. However, it is understood that the number of NFC antennas of the NFC antenna matching network system 230 is not limited to this disclosure. For example, the NFC antenna matching network system 230 is implemented to include two NFC antennas or to include four or more NFC antennas.

FIGS. 3 to 6 are diagrams illustrating a source coil and a resonant coil according to embodiments of the inventive concept. A smart NFC antenna matching network system 230 according to the inventive concept includes a source coil Ls10 and a resonant coil Lr10. Below, various shapes of the source coil Ls10 and the resonant coil Lr10 will be more fully described.

Figure 3:
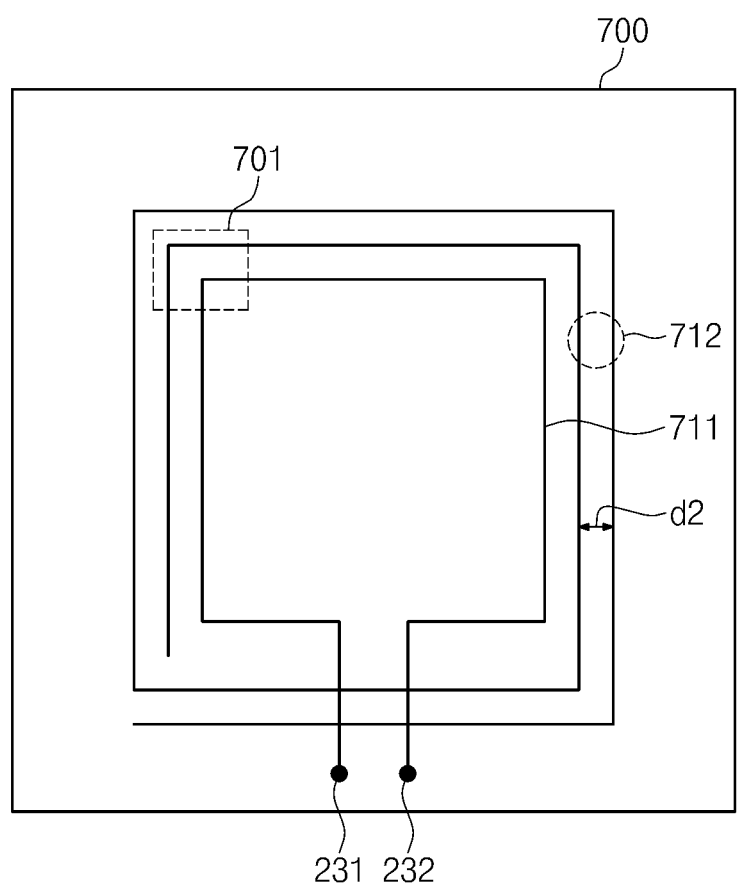
FIGS. 3 to 6 are diagrams illustrating a source coil and a resonant coil according to embodiments of the inventive concept.

Referring to FIG. 3, a first conductive line 711 and a second conductive line 712 are formed on a film 700. The first conductive line 711 is formed to have a loop shape, and the second conductive line 712 is formed to have a spiral shape. The first conductive line 711 corresponds to a source coil SC, and the second conductive line 712 corresponds to a resonant coil RC. A width and a length of each of the first and second conductive lines 711 and 712 are be adjusted variously.

In exemplary embodiments, in the event that the source coil SC and the resonance coil RC shown in FIG. 3 are used in an NFC antenna matching network system 230 for POS (Point Of Sales) for a credit card payment, each of the first and second conductive lines 711 and 712 is formed of a 0.5- to 1.2-mm-wise line.

A length (or, the number of winding turns) of each of the first and second conductive lines 711 and 712 is decided according to inductance for a resonance frequency. A length of the second conductive line 711, for example, is decided to have the number of winding turns suitable to form inductance of 4 µH to 9 µH. An area (hereinafter, referred to as a coil formation area or an antenna formation area) where the second conductive line 712 is formed is decided to have an area of about 20 cm² to 54 cm².

In example embodiments, a capacitor being a lumped element may be connected between both ends of the second conductive line 712 corresponding to a resonant coil Lr10. Also, both ends of the second conductive line 712 corresponding to a resonant coil Lr10 may be electrically connected. In the event that both ends of the second conductive line 712 corresponding to a resonant coil Lr10 are electrically connected, a capacitor forming a parallel resonance circuit with the resonant coil Lr10 may be formed of parasite capacitance.

In FIG. 3, there is illustrated an example in which the first conductive line 711 and the second conductive line 712 are together formed on one of a top surface and a bottom surface of the film 700. In contrast, the first conductive line 711 is formed on one of the top surface and the bottom surface of the film 700, and the second conductive line 712 is formed on the other of the top surface and the bottom surface of the film 700. For example, referring to FIG. 4, the first conductive line 711 is formed on the top surface of the film 700, and the second conductive line 712 is formed on the bottom surface of the film 700. Alternatively, the first conductive line 711 is formed on the bottom surface of the film 700, and the second conductive line 712 is formed on the top surface of the film 700. A width and a length of each of the first and second conductive lines 711 and 712 may be changed variously. The first conductive line 711 is formed to have a loop shape, and the second conductive line 712 is formed to have a spiral shape.

Figure 4:
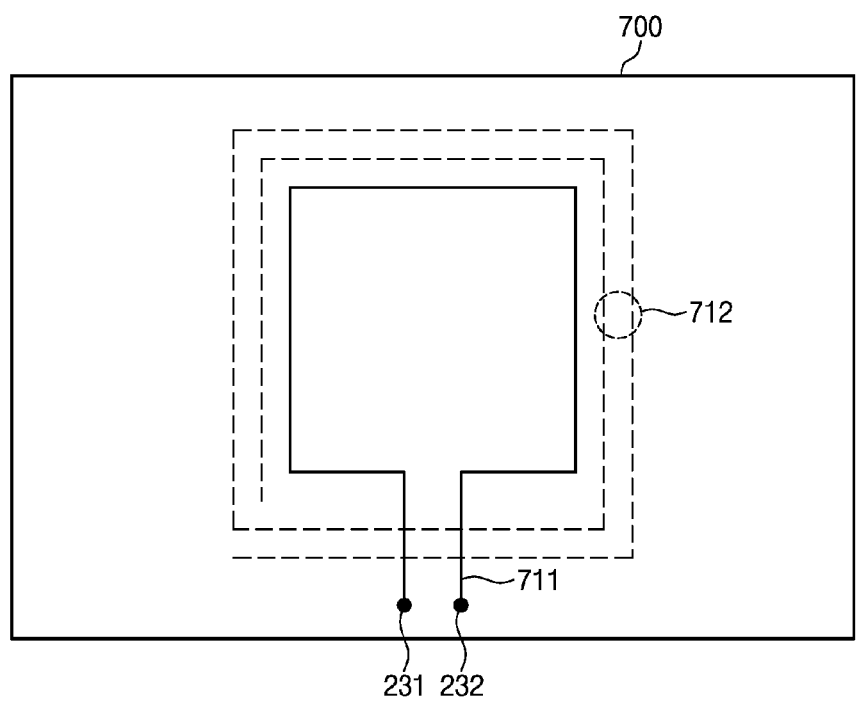
Figure 5:
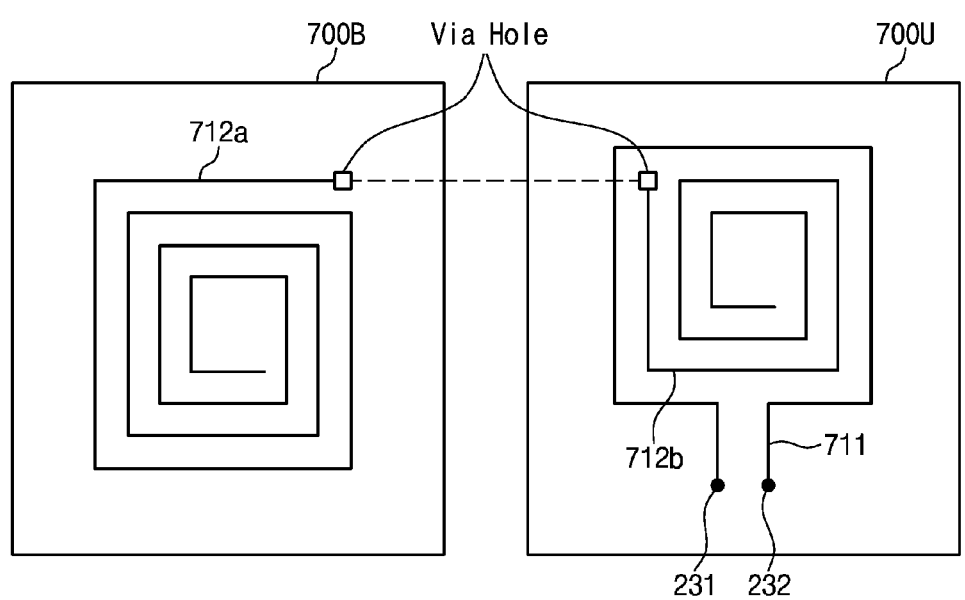

In FIGS. 3 and 4, there is illustrated an example in which the second conductive line 712 is formed of a conductive line. However, the second conductive line 712 can be formed of at least two conductive lines. Referring to FIG. 5, for example, a conductive line 712a is formed on a bottom surface 700B of the film 700, and a conductive line 712b is formed on a top surface 700U of the film 700. In this case, the conductive lines 712a and 712b corresponding to a resonant coil Lr10 are electrically connected through a via hole penetrating the film 700. The first conductive line 711 is formed to have a loop shape, and each of the conductive lines 712a and 712b corresponding to the resonant coil Lr10 is formed to have a spiral shape.

In example embodiments, one end of the conductive line 712a and one end of the conductive line 712b are directly connected. Or, one end of the conductive line 712a and one end of the conductive line 712b are electrically connected with a capacitor being a lumped element interposed between the one end of the conductive line 712a and one end of the conductive line 712b.

Figure 6:
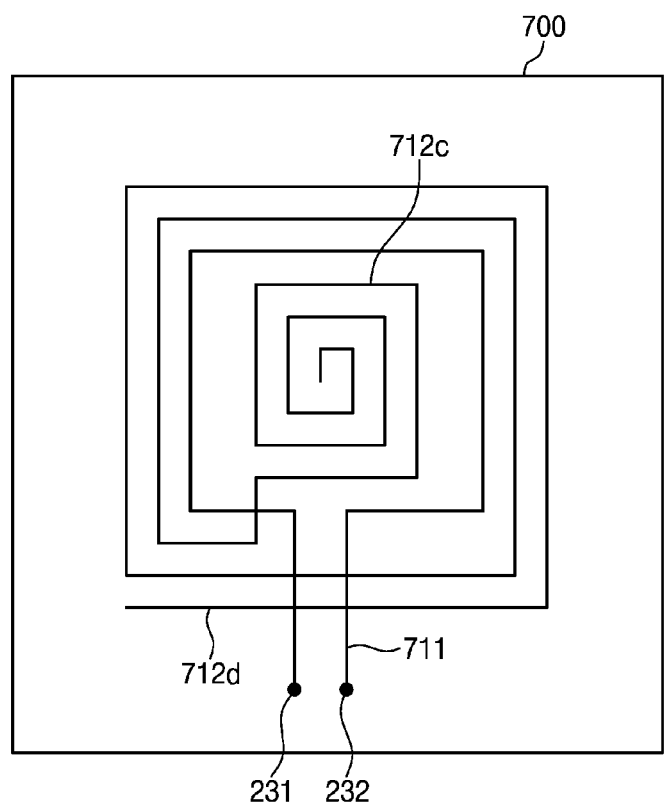

In FIG. 5, there is illustrated an example in which one of two conductive lines forming the second conductive line 712 is formed on a top or bottom surface of the film 700 and the other thereof is formed on a bottom or top surface of the film 700. However, two conductive lines forming the second conductive line 712 can be formed on one of the top surface and the bottom surface of the film 700. Referring to FIG. 6, for example, two conductive lines 712c and 712d forming the second conductive line 712 are formed on a top/bottom surface of the film 700 on which the first conductive line 711 corresponding to the source coil Lc10 is formed. In this case, one 712c of two conductive lines 712c and 712d forming the second conductive line 712 is formed within an inner space defined by the first conductive line 711, and the other thereof is formed outside the first conductive line 711. The first conductive line 711 is formed to have a loop shape, and each of the conductive lines 712c and 712d corresponding to the resonant coil Lr10 is formed to have a spiral shape. One ends of the conductive lines 712c and 712d are electrically connected, and the others thereof are electrically connected with a capacitor being a lumped element interposed.

In FIG. 6, there is illustrated where one square pattern is formed within an inner space defined by the first conductive line 711. However, it is understood that the number of square patterns formed within an inner space defined by the first conductive line 711 is not limited to this disclosure. For example, two or more square patterns may be formed within an inner space defined by the first conductive line 711.

In FIGS. 3 to 6, there are illustrated examples where a resonance coil is formed to have a quadrangle. However, the inventive concept is not limited thereto. For example, the resonance coil is formed to have a circle. An interval among winding turns of the resonance coil is regular or irregular.

Figure 7:
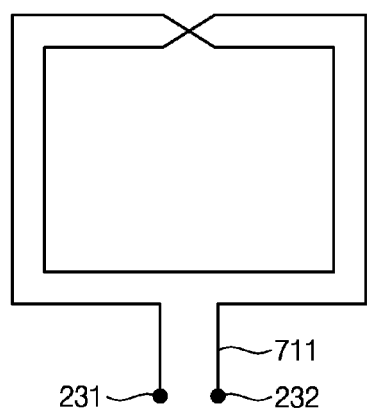
FIG. 7 is a diagram illustrating a source coil according to another embodiment of the inventive concept.

FIG. 7 is a diagram illustrating a source coil according to another embodiment of the inventive concept.

In FIGS. 3 to 6, there is illustrated an example in which a source coil is formed of a single-loop coil. A source coil Ls10 can be formed of a multi-loop coil. As illustrated in FIG. 7, for example, a first conductive line 711 corresponding to the source coil Ls10 is formed to have two loops connected in series. It is understood that the number of loops of the first conductive line 711 is not limited to this disclosure. Source coils Ls10 illustrated in FIGS. 3 to 6 can be replaced with the source coil Ls10 illustrated in FIG. 7.

In example embodiments, an antenna structure according to the inventive concept is applicable to asymmetric and symmetric structures.

In example embodiments, if a source coil and a resonant coil are placed to be adjacent to each other, locations of the source coil and the resonant coil may not be limited. For example, the source coil may be formed on a battery, and the resonant coil may be formed on a case of a mobile device (or, a battery cover) adjacent to the battery.

Shapes of source and resonance coils shown in FIGS. 3 to 7 are described based on a first NFC antenna 230A1 shown in FIG. 2. Like the first NFC antenna 230A1, second and third NFC antennas 230A2 and 230A3 are implemented to have shapes of source and resonance coils described with reference to FIGS. 3 to 7. Although shapes of the source and resonance coils are equal to each other, antenna formation areas (or, coil formation areas), that is, areas where the source and resonance coils are formed have different sizes. In other words, the size of the first NFC antenna 230A1, the size of the second NFC antenna 230A2, and the size of the third NFC antenna 230A3 are different from one another.

FIGS. 8A to 8F are diagrams schematically illustrating NFC antenna matching network systems according to other embodiments of the inventive concept.

Figure 8A:
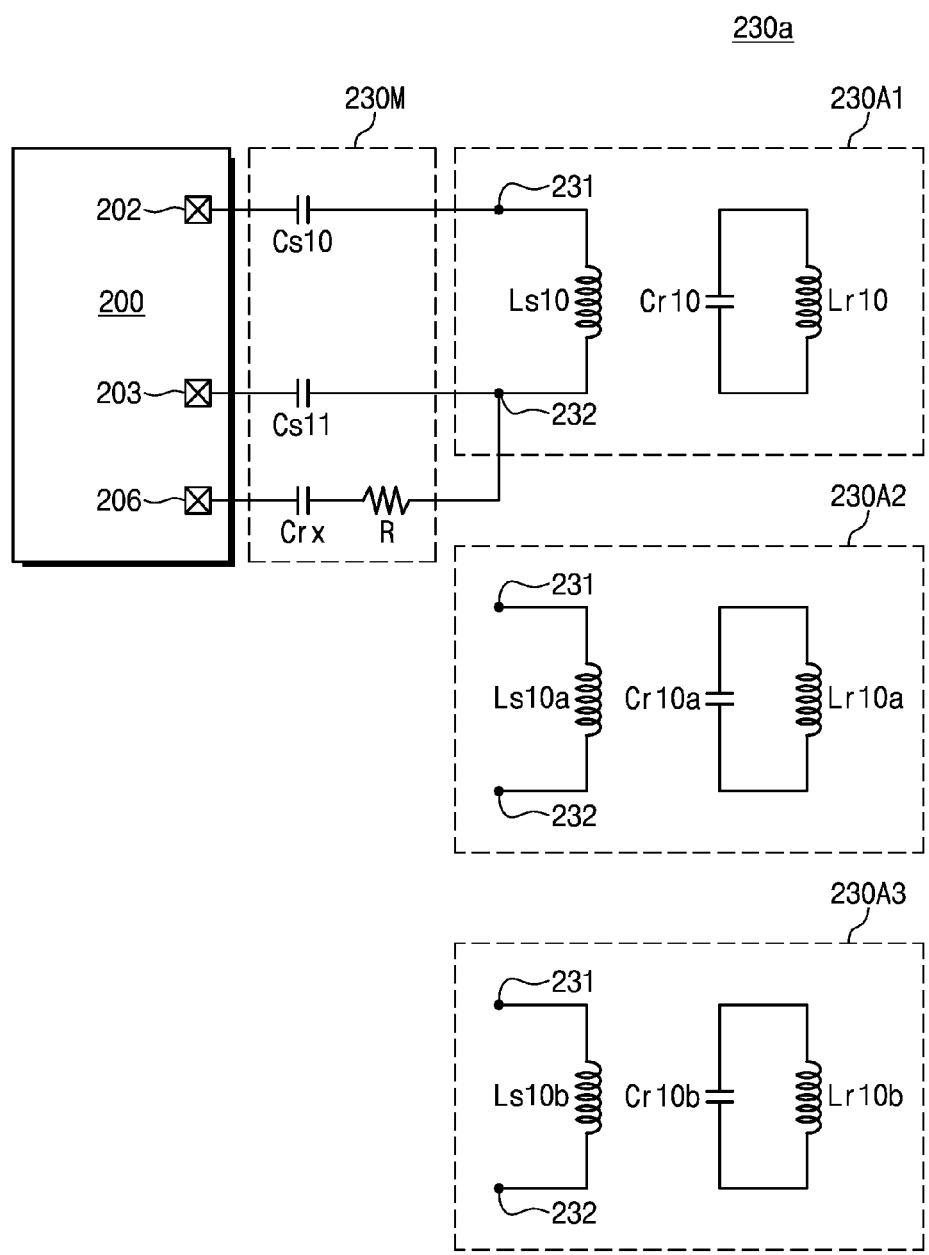
FIGS. 8A to 8F are diagrams schematically illustrating NFC antenna matching network systems according to other embodiments of the inventive concept.

Referring to FIG. 8A, an NFC antenna matching network system 230a includes a matching circuit 230M and first to third NFC antennas 230A1 to 230A3. The matching circuit 230M and the first to third NFC antennas 230A1 to 230A3 are substantially the same as that those shown in FIG. 2 except a capacitor Crx and a resistor R are connected in series between an antenna terminal 232 and a chip terminal 206, and a description thereof is thus omitted.

Figure 8B:
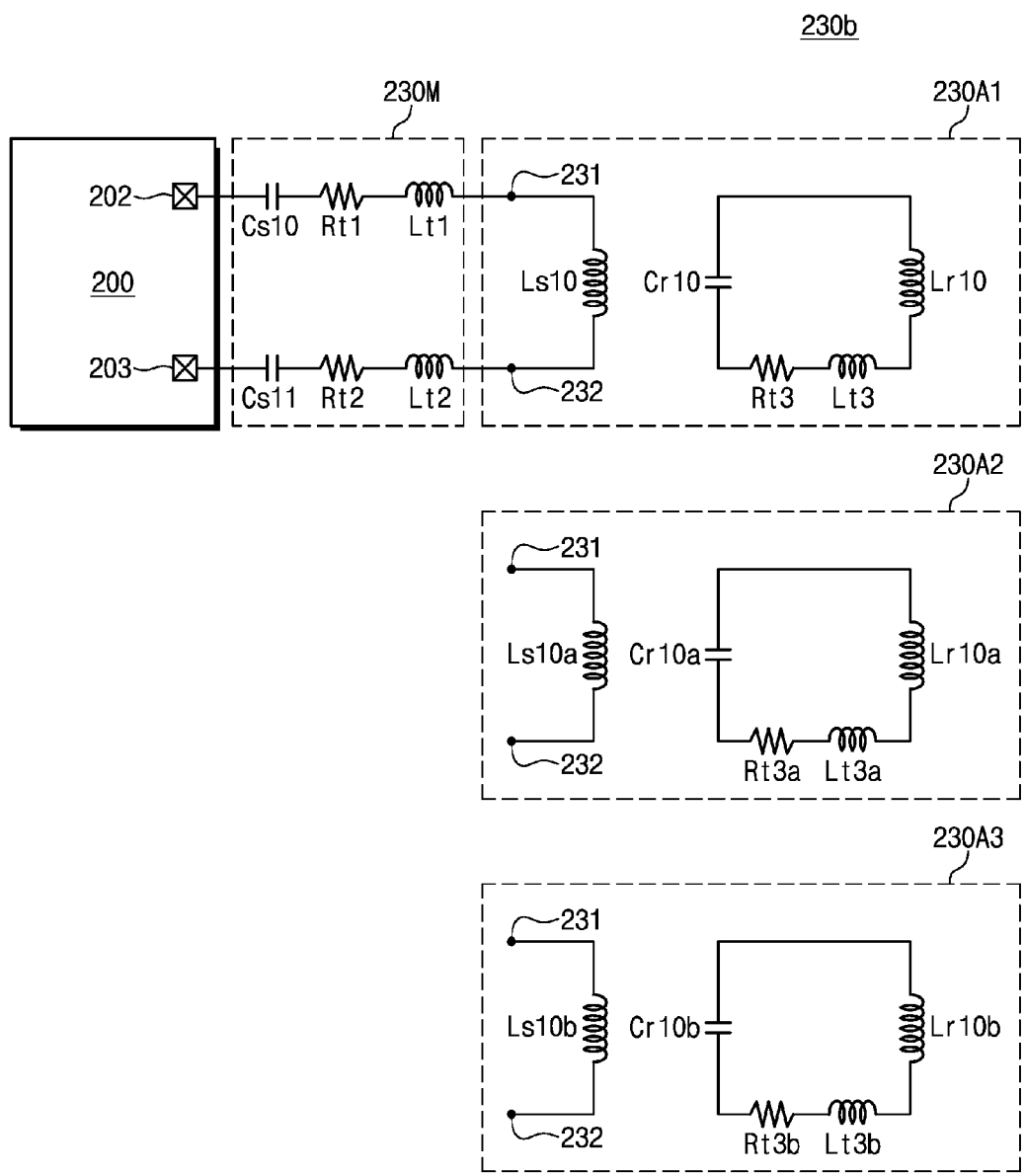

As illustrated in FIG. 8B, a resistor Rt1 and the inductor Lt1 are connected in series between an antenna terminal 231 and a capacitor Cs10, and a resistor Rt2 and the inductor Lt2 are connected in series between an antenna terminal 232 and a capacitor Cs11. Herein, the resistors Rt1 and Rt2 and the inductors Lt1 and Lt2 may be used to tune impedance matching, a bandwidth, a Q value, etc. In some cases, the resistors Rt1 and Rt2 may be removed. For example, the resistors Rt1 and Rt2 or the inductors Lt1 and Lt2 may be used to tune impedance matching, a bandwidth, or a Q value.

Also, the resistor Rt3 and the inductor Lt3 are connected in series between the inductor Lr10 as a resonant coil and the capacitor Cr10. As described above, the resistor Rt3 or the inductor Lt3 may be used to tune impedance matching, a bandwidth, or a Q value. Combination of resistors and inductors may be made variously to tune impedance matching, a bandwidth, or a Q value. Likewise, a resistor Rt3a and an inductor Lt3a of the second NFC antenna 230A2 are connected in series between an inductor Lr10a as a resonant coil and a capacitor Cr10a, and a resistor Rt3b and an inductor Lt3b of the third NFC antenna 230A3 are connected in series between an inductor Lr10b as a resonant coil and a capacitor Cr10b.

Although not shown, it is understood that resistors and/or inductors used to tune impedance matching, a bandwidth, or a Q value is applicable to an NFC antenna matching network system illustrated in FIG. 2.

Figure 8C:
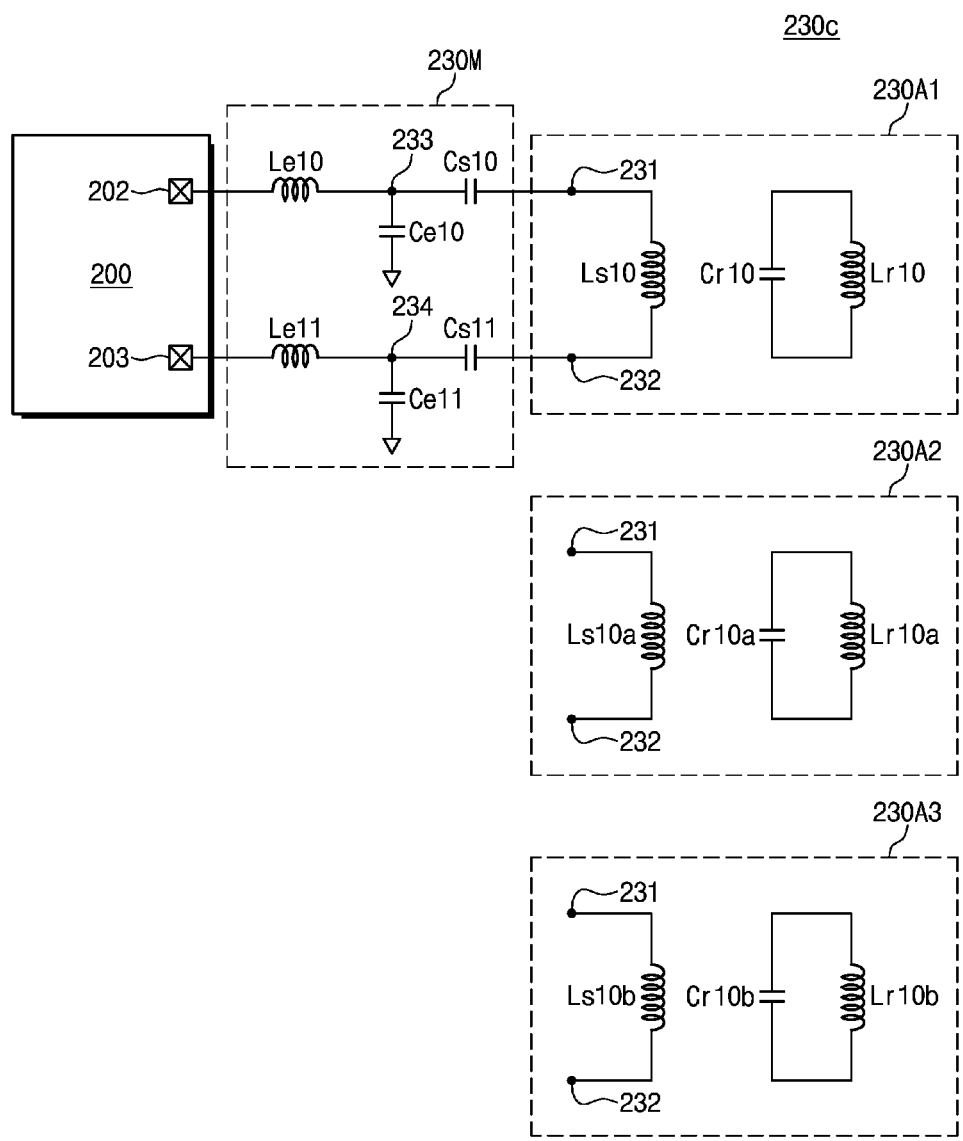

Referring to FIG. 8C, an NFC antenna matching network system 230c according to the inventive concept may include capacitors Ce10, Ce11, Cs10, Cs11, and Cr10 and inductors Le10, Le11, Ls10, and Lr10. The NFC antenna matching network system 230c is electrically connected with chip terminals 202 and 203 of an NFC transceiver 200.

The inductors Le10 and Le11 and the capacitors Ce10 and Ce11 may constitute a filter (e.g., an EMC filter) for removing a harmonic wave of an NFC signal output from the NFC transceiver 200. The inductor Le10 and the capacitor Cs10 are connected between the chip terminal 202 and an antenna node 231, and the capacitor Ce10 is connected between a connection node 233 between the inductor Le10 and the capacitor Cs10 and a reference potential (e.g., a ground voltage). The inductor Le11 and the capacitor Cs11 are connected between the chip terminal 203 and an antenna node 232, and the capacitor Ce11 is connected between a connection node 234 between the inductor Le11 and the capacitor Cs11 and a reference potential (e.g., a ground voltage).

The inductor Ls10 and the capacitors Cs10 and Cs11 may constitute a serial resonator. In example embodiments, the inductor Ls10 may be referred to as a source coil. The capacitor Cr10 and the inductor Lr10 may constitute a parallel resonator. As illustrated in FIG. 8C, the parallel resonator formed of the capacitor Cr10 and the inductor Lr10 are physically separated from the serial resonator that is electrically connected with the chip terminals 202 and 203. In example embodiments, the inductor Lr10 may be referred to as a resonant coil. The source coil Lr10 is physically separated from the resonant coil Ls10. In other words, the resonant coil Lr10 is electrically floated from the source coil Ls10. The source coil Ls10 is supplied with a power from the NFC transceiver 200, and the resonant coil Lr10 is supplied with a power from the source coil Ls10 by magnetic induction. The resonant coil Lr10 may transmit or receive NFC signals by parallel resonance.

Since the NFC antenna matching network system 230d according to an embodiment of the inventive concept transmits and receives NFC signals under a condition where a serial resonator suitable for a transmission mode (i.e., advantageous to form a magnetic field) and a parallel resonator suitable for a reception mode (i.e., advantageous to be supplied with a power) are physically separated, the serial resonator and the parallel resonator may not be influenced each other in terms of impedance. Since the resonant coil Lr10 is floated, impedance seen from the resonant coil Lr10 may become low. Thus, a quality (Q) factor may become high, and the strength of current induced at the resonant coil Lr10 (or, the strength of a magnetic field) may increase. Also, as the strength of current induced or the strength of a magnetic field increases, a recognition distance or a reception voltage may increases.

Also, as impedance of a reader mode of a serial resonance become low, reception of a high current is possible. As impedance of a reader mode of a parallel resonance become high, a high voltage is induced. An increase in a magnetic field enables freedom of an antenna location to increase; therefore, performance of a small-sized antenna is improved. That is, trade-off between formation of a magnetic field of a reader mode and a transmission/reception voltage of a card mode is eliminated. Since the strength of current Lr10 (or, the strength of a magnetic field), a recognition distance or a reception voltage increases compared with a typical NFC antenna matching network system, it is possible to satisfy the EMV power specification using an NFC antenna that is formed at a less area (e.g., 20 cm$^2$). This means that the NFC antenna matching network system of the inventive concept does not necessitate an external amplifier.

The second and third NFC antennas 230A2 and 230A3 obtain the same effect as the first NFC antenna 230A1.

Figure 8D:
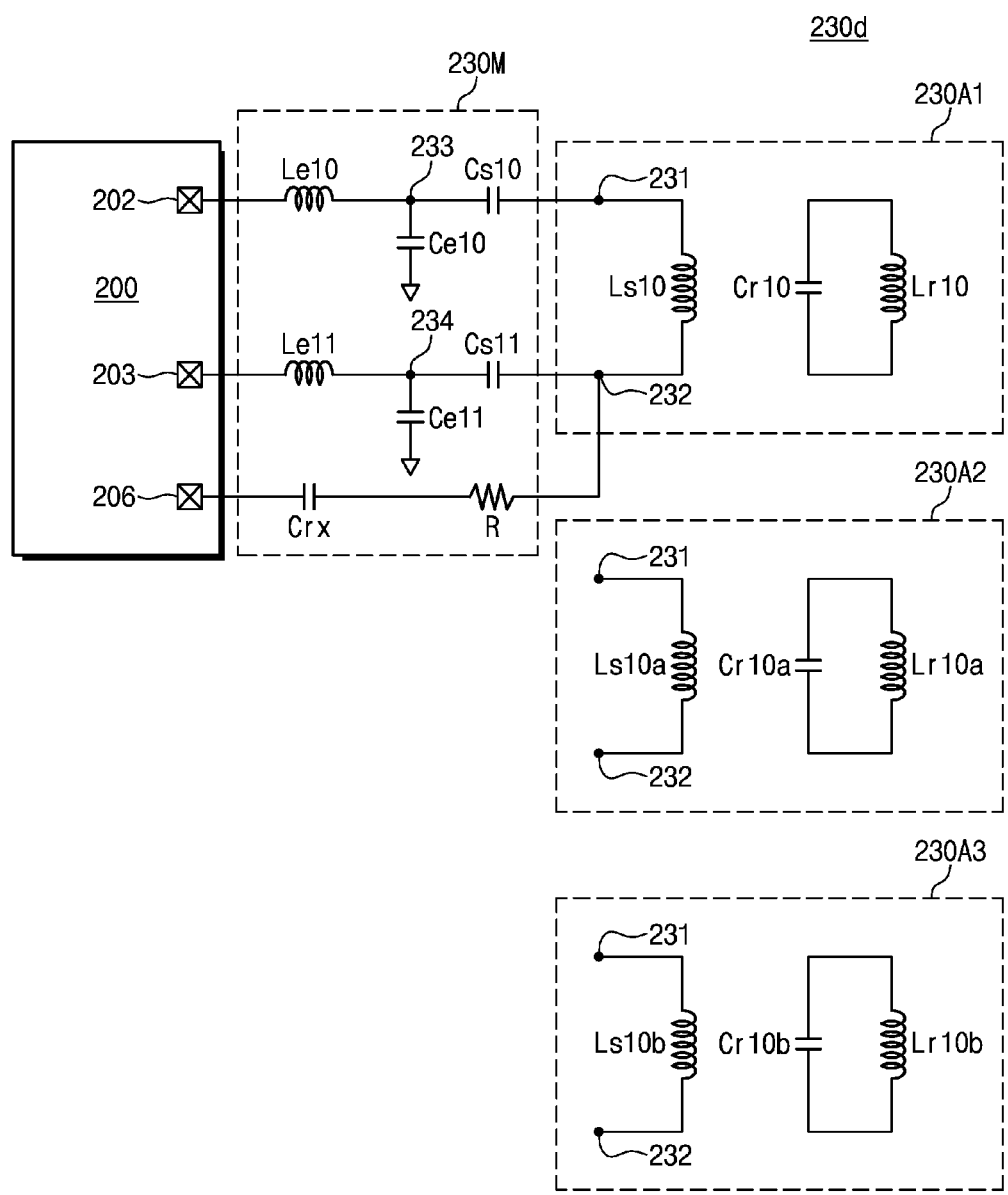

Referring to FIG. 8D, an NFC antenna matching network system 230d includes a matching circuit 230M and first to third NFC antennas 230A1 to 230A3. The matching circuit 230M and the first to third NFC antennas 230A1 to 230A3 are substantially the same as that those shown in FIG. 2 except a capacitor Crx10 and a resistor R10 are connected in series between an antenna terminal 232 and a chip terminal 206, and a description thereof is thus omitted.

Figure 8E:
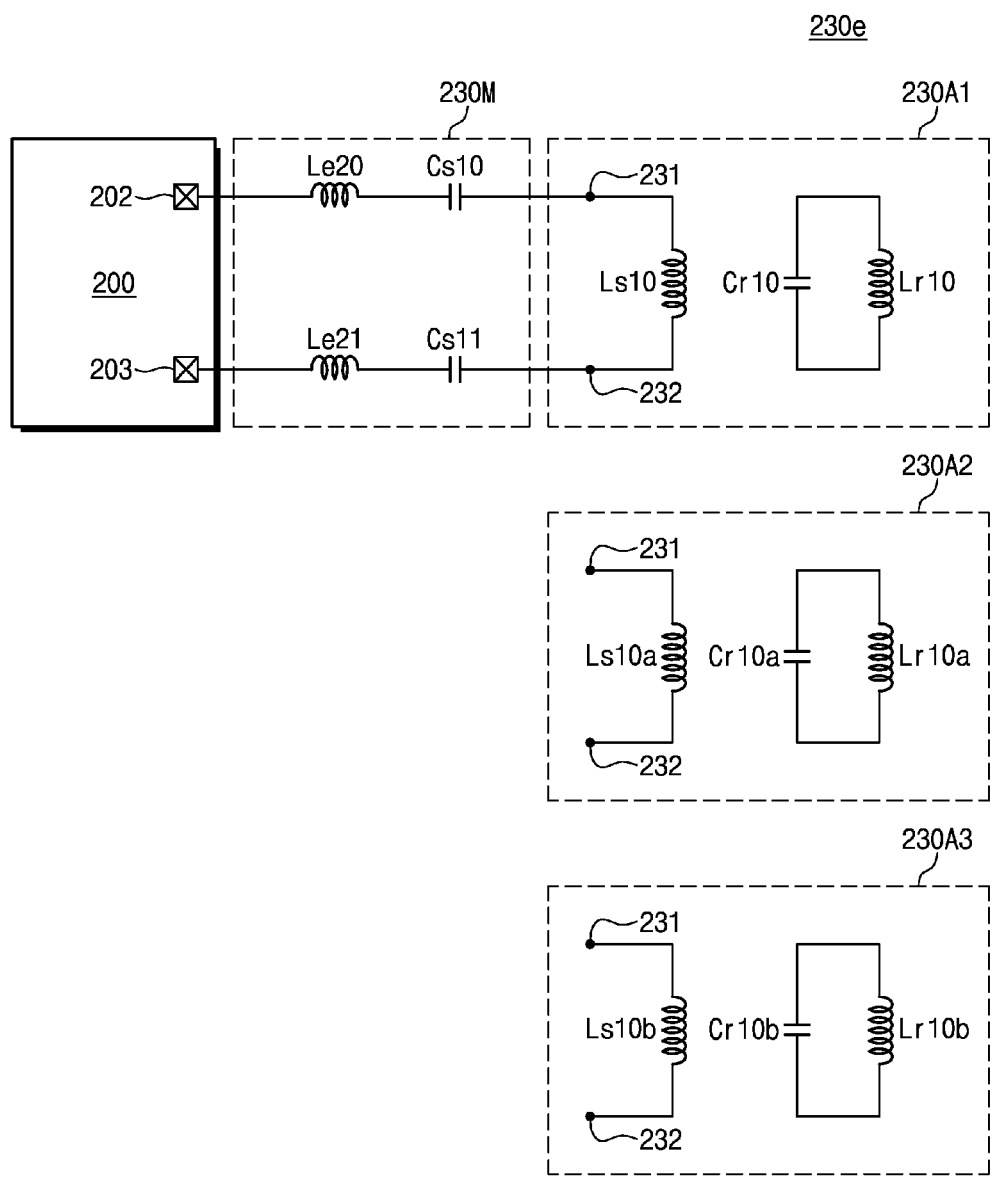

Referring to FIG. 8E, an NFC antenna matching network system 230e includes capacitors Ce10, Ce11, and Cr10 and inductors Le10, Le20, Le21, Ls10, and Lr10. The NFC antenna matching network system 230e is electrically connected to chip terminals 202 and 203 of an NFC transceiver 200.

The inductor Le20 and the capacitor Cs10 are connected in series between the chip terminal 202 and an antenna node 203, and the inductor Le21 and the capacitor Cs11 are connected in series between the chip terminal 203 and an antenna node 232. In example embodiments, the inductor Ls10 may be referred to as a source coil. The capacitor Cr10 and the inductor Lr10 may form a parallel resonator. As illustrated in FIG. 8E, the parallel resonator formed of the capacitor Cr10 and the inductor Lr10 may be physically separated from the serial resonator that is electrically connected with the chip terminals 202 and 203. In example embodiments, the inductor Lr10 may be referred to as a resonant coil. The source coil Ls10 is physically separated from the resonant coil Lr10. In other words, the resonant coil Lr10 is electrically floated from the source coil Ls10. The source coil Ls10 may be supplied with a power from the reader 210, and the resonant coil Lr10 may be supplied with a power from the source coil Ls10 by magnetic induction. The resonant coil Lr10 transmits or receives NFC signals by parallel resonance.

The NFC antenna matching network system 230e according to an embodiment of the inventive concept may transmit and receive NFC signals under a condition where a serial resonator suitable for a transmission mode (i.e., advantageous to form a magnetic field) and a parallel resonator suitable for a reception mode (i.e., advantageous to be supplied with a power) are physically separated. In this case, the serial resonator and the parallel resonator may not be influenced each other in terms of impedance. Impedance seen from the resonant coil Lr10 become low because the resonant coil Lr10 is floated. Thus, a quality factor increases, and the strength of current (or, the strength of a magnetic field) induced at the resonant coil Lr10 increases. As the strength of current induced or the strength of a magnetic field increases, also, a recognition distance or a reception voltage may increases.

Also, as impedance of a reader mode of a serial resonance become low, reception of a high current is possible. As impedance of a reader mode of a parallel resonance become high, a high voltage is induced. An increase in a magnetic field enables freedom of an antenna location to increase; therefore, performance of a small-sized antenna is improved. That is, trade-off between formation of a magnetic field of a reader mode and a transmission/reception voltage of a card mode is eliminated. Since the strength of current Lr10 (or, the strength of a magnetic field), a recognition distance or a reception voltage increases compared with a typical NFC antenna matching network system, it is possible to satisfy the EMV power specification using an NFC antenna that is formed at a less area (e.g., 20 cm$^2$). This means that the NFC antenna matching network system of the inventive concept does not necessitate an external amplifier.

The second and third NFC antennas 230A2 and 230A3 obtain the same effect as the first NFC antenna 230A1.

Figure 8F:
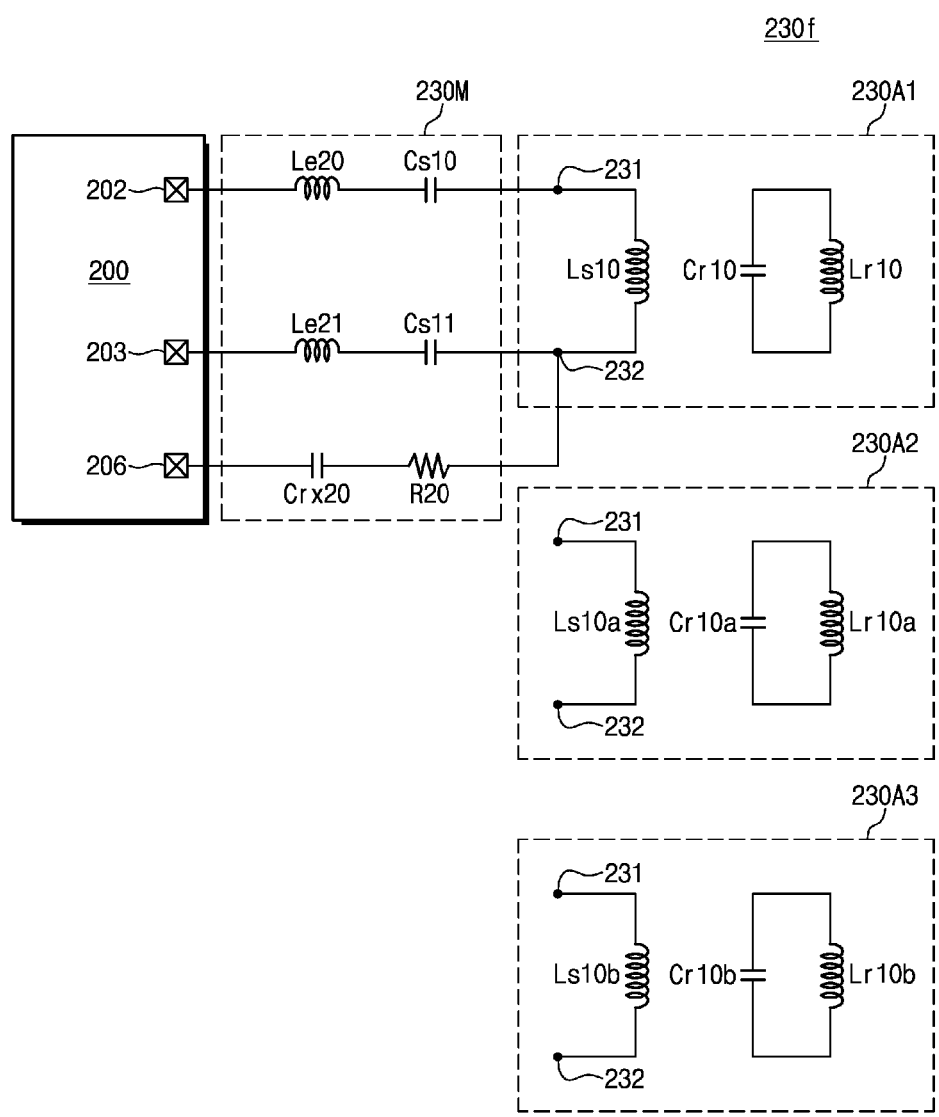

Referring to FIG. 8F, an NFC antenna matching network system 230f includes a matching circuit 230M and first to third NFC antennas 230A1 to 230A3. The matching circuit 230M and the first to third NFC antennas 230A1 to 230A3 are substantially the same as that those shown in FIG. 2 except a capacitor Crx20 and a resistor R20 are connected in series between an antenna terminal 232 and a chip terminal 206, and a description thereof is thus omitted.

In FIGS. 8A to 8F, a capacitor may be selectively connected between antenna terminals 231 and 232. Also, as described with reference to FIG. 8B, a parallel resonator is implemented such that a resistor and/or an inductor is selectively inserted between a capacitor and a resonance coil. Likewise, a resistor and/or an inductor is selectively inserted between a source coil Ls10 and a capacitor Cs10.

Figure 9:
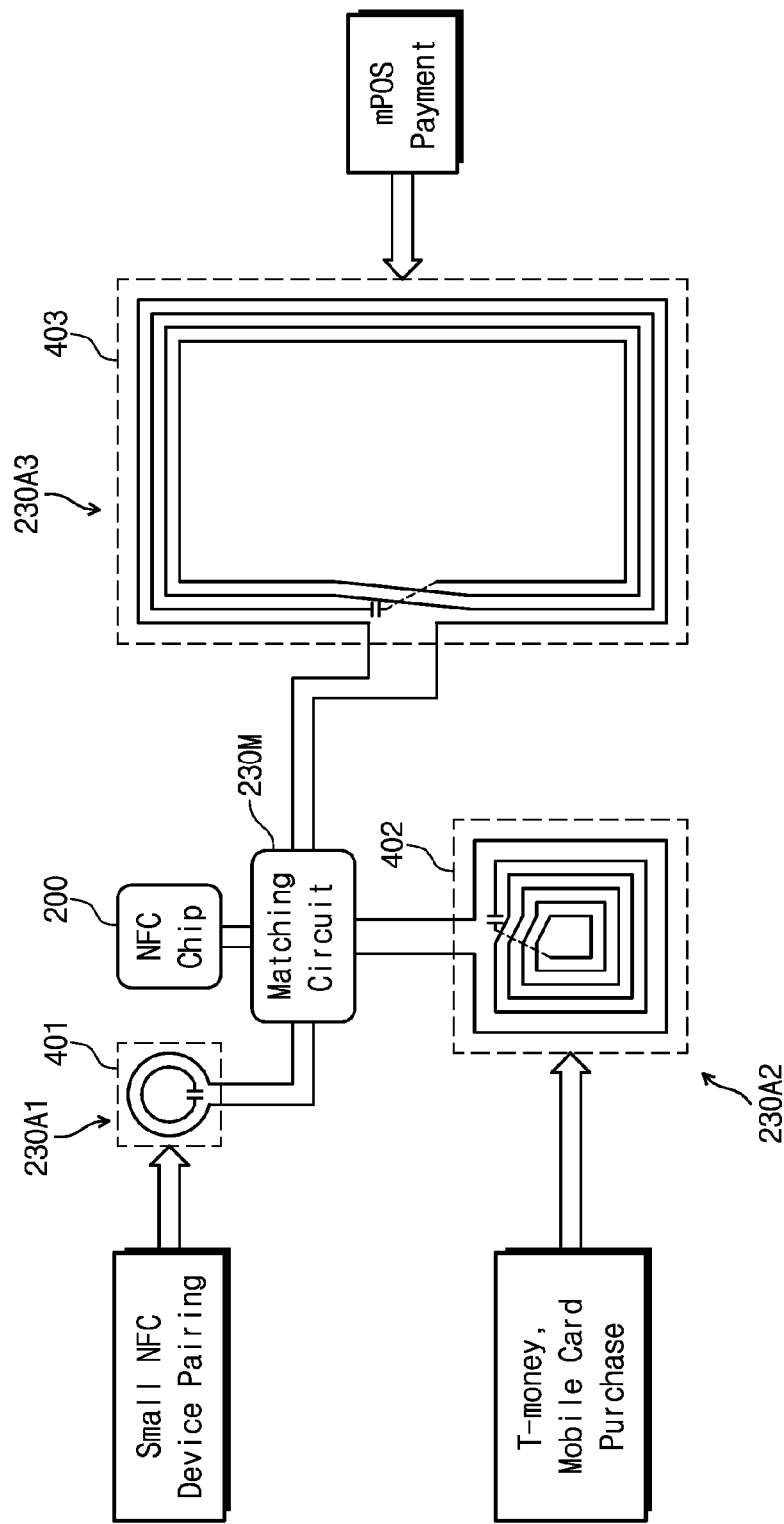
FIG. 9 is a diagram schematically illustrating a user device including an NFC antenna network system of the inventive concept.

FIG. 9 is a diagram schematically illustrating a user device including an NFC antenna network system 230 of the inventive concept.

Referring to FIG. 9, a user device, for example, includes an NFC chip 200, a matching circuit 230M, and first to third NFC antennas 230A1 to 230A3. Each of the first to third NFC antennas 230A1 to 230A3, as described with reference to FIGS. 3 to 7, is formed of a source coil having a loop shape and a resonance coil having a spiral shape. As understood from FIG. 9, an antenna area 401 where the first NFC antenna 230A1 is formed, an antenna area 402 where the second NFC antenna 230A2 is formed, and an antenna area 403 where the third NFC antenna 230A3 is formed are disposed at different locations (e.g., a battery pack, a flip cover, and the like) of the user device. As understood from FIG. 9, also, the sizes of the antenna areas 401 to 403 are different from one another. For example, the first NFC antenna 230A1 is used for pairing of a small-size NFC device, the second NFC antenna 230A2 is used for purchase of T-money, mobile card, etc., and the third NFC antenna 230A3 is used for payment of a mobile POS (Point Of Sales). However, it is understood that uses of the first to third NFC antennas 230A1 to 230A3 are not limited to this disclosure.

In a typical NFC antenna matching network system, capacitors for serial resonance and capacitors for parallel resonance may be electrically connected with an antenna. In this case, the capacitors for serial resonance may be affected by the capacitors for parallel resonance in terms of impedance, or the capacitors for parallel resonance may be affected by the capacitors for serial resonance in terms of impedance. This influence may cause lowering of a transfer performance (or, a quality factor) of the typical NFC antenna matching network system. In particular, in a POS system for credit card payment, an antenna with the size of 56 cm$^2$ (8 cm×7 cm) or more is required to satisfy the EMV power specification. An antenna with a minimum size of 20 cm$^2$ (4 cm×5 cm) is required to satisfy the EMV power specification where a z-axis distance is about 2 cm. For example, For example, high impedance of the typical NFC antenna matching network system may act as a limitation when a magnetic field is generated at a reader mode. Thus, for a mobile device to use an antenna with the size satisfying the above-described specification, the typical NFC antenna matching network system necessitates an external amplifier because of limitation of an area where an antenna is formed. Since a reader mode and a card mode are performed using the same antenna and matching network, trade-off occurs between formation of a magnetic field of a reader mode and a transmission/reception voltage of a card mode.

In contrast, the NFC antenna matching network system 230 according to an embodiment of the inventive concept may transmit and receive NFC signals under a condition where a serial resonator suitable for a transmission mode (i.e., advantageous to form a magnetic field) and a parallel resonator suitable for a reception mode (i.e., advantageous to be supplied with a power) are physically separated. In this case, the serial resonator and the parallel resonator may not be influenced each other in terms of impedance. Compared with a typical NFC antenna matching network system, impedance seen from the resonant coil Lr10 may be low. The reason may be that the resonant coil Lr10 is floated. This may mean that impedance of the source coil Lr10 is reduced. As impedance is reduced, the amount of current flowing via the source coil Ls10 may increase relatively. This may mean that the strength of current induced at the resonant coil Lr10 (or, the strength of a magnetic field) increases. As the strength of current induced or the strength of a magnetic field increases, a recognition distance or a reception voltage may increases.

In this case, as impedance of a reader mode of a serial resonance become low, reception of a high current is possible. As impedance of a reader mode of a parallel resonance become high, a high voltage is induced. An increase in a magnetic field enables freedom of an antenna location to increase; therefore, performance of a small-sized antenna is improved. As impedance of a reader mode of a serial resonance become low, reception of a high current is possible. As impedance of a reader mode of a parallel resonance become high, a high voltage is induced. An increase in a magnetic field enables freedom of an antenna location to increase; therefore, performance of a small-sized antenna is improved. That is, trade-off between formation of a magnetic field of a reader mode and a transmission/reception voltage of a card mode is eliminated. Since the strength of current Lr10 (or, the strength of a magnetic field), a recognition distance or a reception voltage increases compared with a typical NFC antenna matching network system, it is possible to satisfy the EMV power specification using an NFC antenna that is formed at a less area (e.g., 20 cm$^2$). This means that the NFC antenna matching network system does not necessitate an external amplifier.

Figure 10:
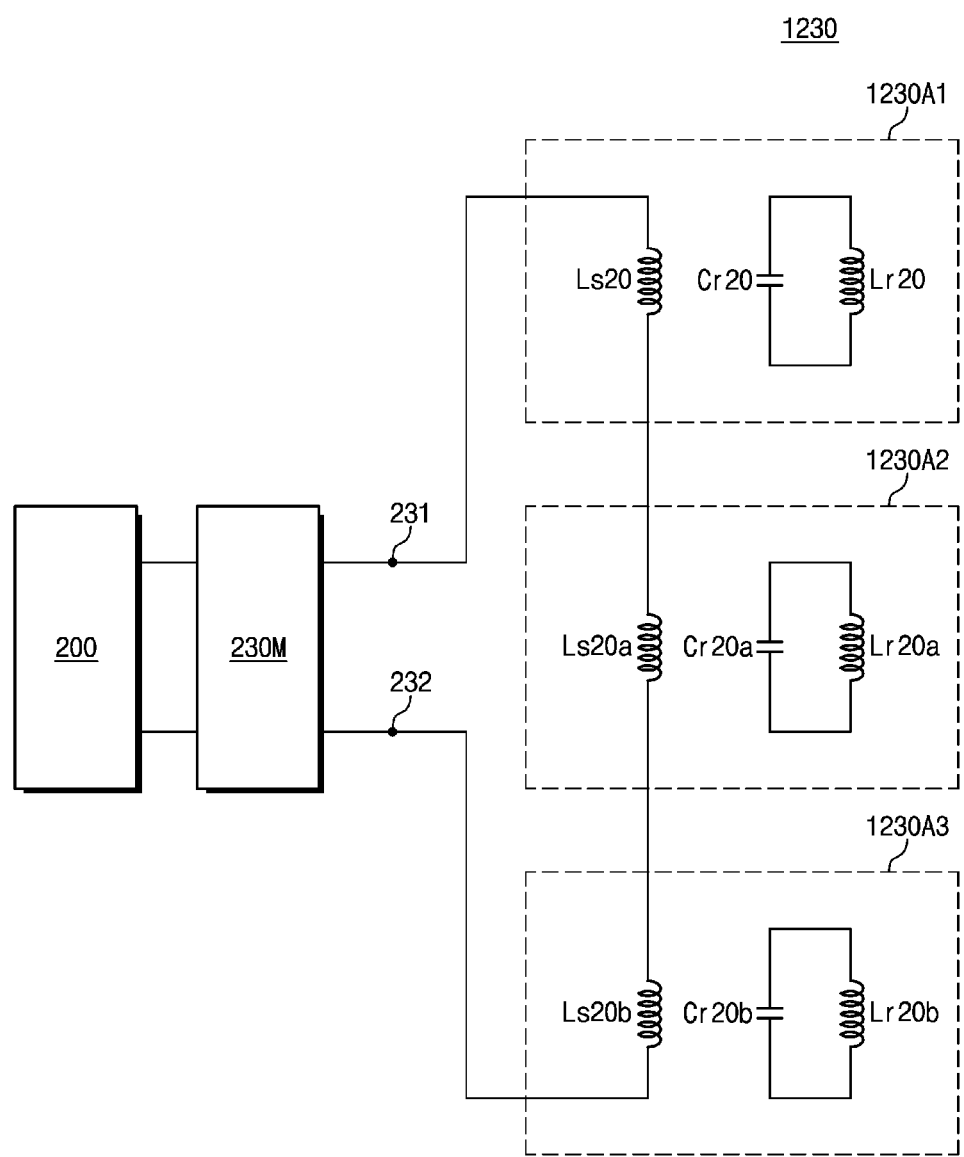
FIG. 10 is a block diagram schematically illustrating an NFC antenna matching network system shown in FIG. 1, according to another embodiment of the inventive concept.

FIG. 10 is a block diagram schematically illustrating an NFC antenna matching network system shown in FIG. 1, according to another embodiment of the inventive concept.

Referring to FIG. 10, an NFC antenna matching network system 1230 includes a matching circuit 230M connected to antenna terminals 231 and 232. The matching circuit 230M is one of matching circuits described with reference to FIGS. 2 and 8A to 8F. The NFC antenna matching network system 1230 further includes a first inductor Ls20, a second inductor Ls20a, and a third inductor Ls20b that are connected in series between the antenna terminals 231 and 232. Each of the first to third inductors Ls20 to Ls20b may act as a source coil. The NFC antenna matching network system 1230 further comprises first to third parallel resonators corresponding to the first to third inductors Ls20 to Ls20b. Each of the first to third parallel resonators is formed of a capacitor and an inductor. For example, the first parallel resonator includes a capacitor Cr20 and an inductor Lr20, the second parallel resonator includes a capacitor Cr20a and an inductor Lr20a, and the third parallel resonator includes a capacitor Cr20b and an inductor Lr20b. Each of the first to third parallel resonators is physically separated from a corresponding source coil.

Here, the source coil Ls20, the capacitor Cr20, and the inductor Lr20 form a first NFC antenna 1230A1, the source coil Ls20a, the capacitor Cr20a, and the inductor Lr20a form a second NFC antenna 1230A2, and the source coil Ls20b, the capacitor Cr20b, and the inductor Lr20b form a third NFC antenna 1230A3.

The NFC antenna matching network system 1230 shown in FIG. 10 is substantially the same as that described with reference to one of FIGS. 2 and 8A to 8F except source coils are connected in series between the antenna terminals 231 and 232, and a description thereof is thus omitted.

Figure 11:
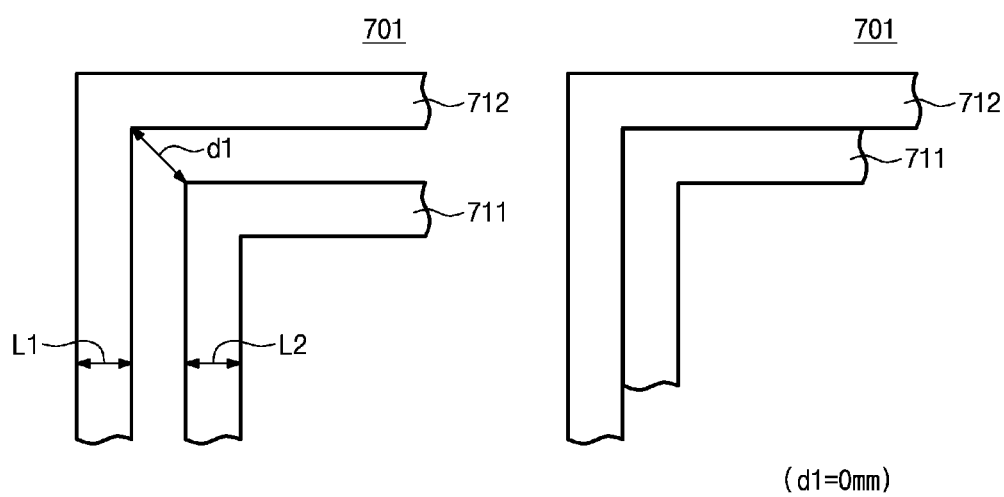
FIG. 11 is an expanded diagram of a dotted line shown in FIG. 3.

FIG. 11 is an expanded diagram of a dotted line 701 shown in FIG. 3.

In FIG. 11, there is illustrated an example where a second conductive line 712 corresponding to a resonance coil is formed outside a first conductive line 711 corresponding to a source coil. As described with reference to FIG. 6, it is understood that the second conductive line 712 is formed within an inner space defined by the first conductive line

711. A width L1 of the first conductive line 711 corresponding to the source coil and a width L2 of the second conductive line 712 corresponding to the resonance coil, for example, may be 0.5 mm to 1.2 mm. The width L1 of the first conductive line 711 is equal to or different from the width L2 of the second conductive line 712. The number of winding turns of the second conductive line 712 is decided to have 4 µH to 9 µH. An interval d2 (refer to FIG. 3) between lines corresponding to adjacent winding turns of the resonance coil may be 0.3 mm to 0.6 mm.

In particular, a power output via an NFC antenna matching network system is based on inductive coupling between a source coil and a resonance coil. In other words, a maximum power is obtained when the inductive coupling between the source coil and the resonance coil is optimized. In exemplary embodiments, an interval d1 between the first conductive line 711 and the second conductive line 712 for obtaining the maximum power is within about 0 mm to 1 mm. That is, an interval d1 between the outermost edge of a square pattern forming the first conductive line 711 and the innermost edge of a square pattern forming the second conductive line 712 is within about 0 mm to 1 mm. That the interval d1 is 0 mm, as illustrated at a right side of FIG. 11, means that the outermost edge of a square pattern forming the first conductive line 711 and the innermost edge of a square pattern forming the second conductive line 712 are in contact. Also, that the interval d1 is within 1 mm, as illustrated at a left side of FIG. 11, means that the outermost edge of a square pattern forming the first conductive line 711 and the innermost edge of a square pattern forming the second conductive line 712 are spaced apart from each other within 1 mm. Accordingly, the outermost edge of a square pattern forming the first conductive line 711 and the innermost edge of a square pattern forming the second conductive line 712 are not overlapped.

In exemplary embodiments, the first conductive line 711 is formed on a top surface of a film, and the second conductive line 712 is formed on a bottom surface of the film. Alternatively, the first conductive line 711 and the second conductive line 712 are formed on a top or bottom surface of the film. For example, the first conductive line 711 and the second conductive line 712 are formed on a flip cover of a mobile phone (or, a smart phone).

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A near field communication (NFC) antenna connected to an NFC transceiver, the NFC antenna comprising:
   a source coil connected between first and second terminals of the NFC transceiver, the source coil including a loop shape, the loop shape defining an inner space; and
   a first resonance coil physically separated from the source coil,
   wherein one or more turns of the first resonance coil are provided inside of the inner space.

2. The NFC antenna of claim 1, further comprising
   a second resonance coil physically separated from the source coil,
   wherein one or more turns of the second resonance coil are provided outside of the inner space.

3. The NFC antenna of claim 1, wherein a number of turns of the first resonance coil is greater than or equal to a number of turns of the source coil.

4. The NFC antenna of claim 1, wherein a number of turns of the source coil is greater than or equal to a number of turns of the first resonance coil.

5. The NFC antenna of claim 2,
   wherein one end of the first resonance coil is connected to one end of the second resonance coil, and
   wherein a number of turns of the first resonance coil is greater than or equal to a number of turns of the second resonance coil.

6. The NFC antenna of claim 2,
   wherein one end of the first resonance coil is connected to one end of the second resonance coil, and
   wherein a number of turns of the second resonance coil is greater than or equal to a number of turns of the first resonance coil.

7. The NFC antenna of claim 2,
   wherein the source coil is on a first surface of a film, and the source coil includes one or more turns,
   wherein the first resonance coil is on the first surface of the film, and
   wherein the second resonance coil is on a second surface of the film.

8. The NFC antenna of claim 7, wherein one end of the first resonance coil and one end of the second resonance coil are electrically connected to each other.

9. The NFC antenna of claim 8, wherein the first resonance coil and the second resonance coil are electrically connected through a via hole penetrating the film.

10. The NFC antenna of claim 1, wherein the first resonance coil is within an area of about 20 $cm^2$ to about 54 $cm^2$.

11. The NFC antenna of claim 1, wherein the NFC antenna is on at least one of a front surface, a rear surface, a center, an outside, a flip cover and a battery pack of a mobile device.

12. A near field communication (NFC) antenna connected to an NFC transceiver, the NFC antenna comprising:
   a first source coil connected to a first terminal of the NFC transceiver; and
   a first resonance coil physically separated from the first source coil, the first resonance coil having a loop shape, the loop shape defining an inner space,
   wherein one or more turns of the first source coil is provided inside of the inner space.

13. The NFC antenna of claim 12, further comprising
   a second source coil physically separated from the first resonance coil, the second source coil being connected to a second terminal of the NFC transceiver,
   wherein one or more turns of the second source coil are provided outside of the inner space.

14. The NFC antenna of claim 13, wherein a third source coil is between the first source coil and the second source coil.

15. The NFC antenna of claim 14, further comprising:
   a second resonance coil corresponding to the second source coil; and
   a third resonance coil corresponding to the third source coil.

16. The NFC antenna of claim 15, wherein each of the first to third resonance coils is physically separated from a corresponding source coil.

17. The NFC antenna of claim 13, wherein one end of the first source coil and one end of the second source coil are electrically connected to each other.

18. The NFC antenna of claim 12, wherein a number of turns of the first resonance coil is greater than or equal to a number of turns of the first source coil.

19. The NFC antenna of claim 12, wherein a number of turns of the first source coil is greater than or equal to a number of turns of the first resonance coil.

20. The NFC antenna of claim 13,
wherein one end of the first source coil is connected to one end of the second source coil, and
wherein a number of turns of the first source coil is greater than or equal to a number of turns of the second source coil.

21. The NFC antenna of claim 13,
wherein one end of the first source coil is connected to one end of the second source coil, and
wherein a number of turns of the second source coil is greater than or equal to a number of turns of the first source coil.

22. The NFC antenna of claim 12, wherein the first resonance coil is within an area of about 20 cm² to about 54 cm².

23. The NFC antenna of claim 12, wherein the NFC antenna is on at least one of a front surface, a rear surface, a center, an outside, a flip cover and a battery pack of a mobile device.

24. A near field communication (NFC) antenna matching network system connected to an NFC transceiver, the NFC antenna matching network system comprising:
a first serial resonator having a first source coil, the first serial resonator being between a first and second terminals of the NFC transceiver;
a first parallel resonator electrically isolated from the first serial resonator, the first parallel resonator including a first resonance coil, the first resonance coil having a loop shape, the loop shape defining an inner space, the first parallel resonator configured to exchange signals with the first serial resonator via inductive coupling; and
a matching circuit electrically connected between the NFC transceiver and the first serial resonator, the matching circuit configured to match impedances within the NFC antenna matching network system,
wherein one or more turns of the first source coil is provided inside the inner space.

25. The NFC antenna matching network system of claim 24, wherein a number of turns of the first source coil is greater than or equal to a number of turns of the first resonance coil.

26. The NFC antenna matching network system of claim 24, wherein a number of turns of the first resonance coil is greater than or equal to a number of turns of the first source coil.

27. The NFC antenna matching network system of claim 24, wherein one or more turns of the first resonance coil are provided inside of the first inner space.

28. The NFC antenna matching network system of claim 27, further comprising:
a second parallel resonator including a second resonance coil physically separated from the first serial resonator,
wherein one or more turns of the second resonance coil are provided outside of the first inner space.

29. The NFC antenna matching network system of claim 28,
wherein one end of the first parallel resonator is connected to one end of the second parallel resonator, and
wherein a number of turns of the first resonance coil is greater than or equal to a number of turns of the second resonance coil.

30. The NFC antenna matching network system of claim 24, wherein one or more turns of the first source coil are provided inside of the inner space.

31. The NFC antenna matching network system of claim 30, further comprising a second serial resonator including a second source coil physically separated from the first parallel resonator,
wherein one or more turns of the second source coil are provided outside of the inner space.

32. The NFC antenna matching network system of claim 31,
wherein one end of the first serial resonator is connected to one end of the second serial resonator, and
wherein a number of turns of the first source coil is greater than or equal to a number of turns of the second source coil.

33. The NFC antenna matching network system of claim 24, wherein the first serial resonator and the first parallel resonator are on a first surface of a film.

34. The NFC antenna matching network system of claim 28,
wherein the first serial resonator is on a first surface of a film, and includes one or more turns,
wherein the first parallel resonator is on the first surface of the film, and
wherein the second parallel resonator is on a second surface of the film.

35. The NFC antenna matching network system of claim 24, wherein the matching circuit comprises:
a first capacitor connected between the first antenna terminal and the NFC transceiver; and
a second capacitor connected between the second antenna terminal and the NFC transceiver.

36. The NFC antenna matching network system of claim 35, wherein the matching circuit comprises:
at least one of a first resistor and a first inductor connected between the first capacitor and a first antenna terminal; and
at least one of a second resistor and a second inductor connected between the second capacitor and a second antenna terminal.

37. The NFC antenna matching network system of claim 24, wherein the first parallel resonator is within an area of about 20 cm² to about 54 cm².

38. A mobile device, comprising:
an application processor;
a near field communication (NFC) transceiver connected to the application processor;
a matching circuit connected to the NFC transceiver; and
at least one NFC antenna connected to the matching circuit,
wherein the matching circuit is configured to match impedances of the at least one NFC antenna and the NFC transceiver, and
wherein the at least one NFC antenna includes
a serial resonator including a first source coil connected between first and second terminals of the NFC transceiver; and
a parallel resonator including a first resonance coil electrically isolated from the serial resonator and configured to exchange signals with the serial resonator via inductive coupling, the first resonance coil having a loop shape, the loop shape defining an inner space, wherein one or more turns of the first source coil is provided inside of the inner space.

39. The mobile device of claim 38, wherein the application processor is configured to execute a program for a mobile point-of-sale (POS).

* * * * *